United States Patent [19]
Hennedy et al.

[11] Patent Number: 5,999,562
[45] Date of Patent: Apr. 20, 1999

[54] INTELLIGENT POWER MANAGEMENT FOR A PROGRAMMABLE MATCHED FILTER

[75] Inventors: Michael Hennedy, Staten Island; Sorin Davidovici, Jackson Heights, both of N.Y.

[73] Assignee: Golden Bridge Technology, Inc., N.J.

[21] Appl. No.: 09/090,834

[22] Filed: Jun. 4, 1998

Related U.S. Application Data

[63] Continuation of application No. 08/596,037, Feb. 6, 1996, Pat. No. 5,764,691, which is a continuation-in-part of application No. 08/450,312, May 25, 1995, Pat. No. 5,627,855.

[51] Int. Cl.$^6$ .......................... H04B 1/707; H04B 1/16; H04L 7/00
[52] U.S. Cl. .................. 375/207; 375/206; 375/343; 455/231; 455/343
[58] Field of Search .......................... 375/200, 206, 375/207, 343; 364/724.11; 455/230, 231, 343

[56] References Cited

U.S. PATENT DOCUMENTS

| | | | |
|---|---|---|---|
| 4,112,372 | 9/1978 | Holmes et al. | 375/343 |
| 4,418,393 | 11/1983 | Zscheile, Jr. | 364/724.11 |
| 4,426,630 | 1/1984 | Folkmann | 333/174 |
| 4,507,746 | 3/1985 | Fletcher, Jr. | 364/717.01 |
| 4,583,048 | 4/1986 | Gumacos et al. | 329/302 |
| 4,630,283 | 12/1986 | Schiff | 375/207 |
| 4,653,069 | 3/1987 | Roeder | 380/31 |
| 4,660,164 | 4/1987 | Leibowitz | 364/728.03 |
| 4,672,658 | 6/1987 | Kavehrad et al. | 455/555 |
| 4,691,326 | 9/1987 | Tsuchiya | 375/207 |
| 4,707,839 | 11/1987 | Andren et al. | 375/208 |
| 4,730,340 | 3/1988 | Frazier, Jr. | 375/207 |
| 4,755,983 | 7/1988 | Masak et al. | 375/207 |
| 4,759,034 | 7/1988 | Nagazumi | 375/208 |
| 4,860,307 | 8/1989 | Nakayama | 375/200 |
| 4,903,225 | 2/1990 | Brost | 364/728.03 |
| 4,912,722 | 3/1990 | Carlin | 375/200 |
| 4,969,159 | 11/1990 | Belcher et al. | 375/207 |
| 5,031,192 | 7/1991 | Clark | 375/200 |
| 5,311,544 | 5/1994 | Park et al. | 375/206 |
| 5,448,507 | 9/1995 | Strawn | 364/728.06 |
| 5,568,150 | 10/1996 | Taylor, Jr. et al. | 342/189 |
| 5,627,855 | 5/1997 | Davidovici | 375/207 |
| 5,638,362 | 6/1997 | Dohi et al. | 370/342 |
| 5,715,276 | 2/1998 | Tran et al. | 375/207 |
| 5,742,636 | 4/1998 | Fukushi | 375/200 |
| 5,764,691 | 6/1998 | Hennedy et al. | 375/207 |
| 5,802,102 | 9/1998 | Davidovici | 375/207 |

OTHER PUBLICATIONS

J.H. Cafarella, W.M. Brown, E. Stern and J.A. Alusow, "Acoustoelectric Convolvers for Programmable Matched Filtering in Spread System," Proceedings of The IEEE, vol. 64, No. 5, pp. 756–759, May 1976.

*Primary Examiner*—Stephen Chin
*Assistant Examiner*—Jeffrey W. Gluck
*Attorney, Agent, or Firm*—David Newman Chartered

[57] ABSTRACT

A intelligent power management apparatus for use with a matched-filter. A multiplexer multiplexes shifted-in-phase chips and shifted-quadrature-phase chips from an in-phase-shift register and a quadrature-phase-shift register, respectively, to generate multiplexed chips. The multiplexed chips include alternating sets of shifted-in-phase chips and shifted-quadrature-phase chips. A controller generates a POWERDOWN signal when the multiplexed chips from a received-spread-spectrum signal are unlikely to have a particular-chip sequence. The controller generates an ACTIVATION signal when the multiplexed chips are likely to have the particular-chip sequence present. An adder tree generates a CORRELATION signal when the multiplexed chips have the particular-chip sequence and match or correlate with the settings of the adder tree. A number of AND gates inhibit the multiplexed chips from passing to some or all of the adder tree when the POWERDOWN signal is present, and pass the multiplexed chips to some or all of the adder tree when the ACTIVATION signal is present.

3 Claims, 10 Drawing Sheets

INTELLIGENT POWER MANAGEMENT FOR A PROGRAMMABLE MATCHED FILTER

This patent stems from a continuation application of patent application entitled, INTELLIGENT POWER MANAGEMENT FOR A PROGRAMMABLE MATCHED FILTER, having Ser. No. 08/596,037, and filing date Feb. 6, 1996, which issued as U.S. Pat. No. 5,764,691 on Jun. 9, 1998, which is a continuation-in-part application of U.S. patent application Ser. No. 08/450,312, filed May 25, 1995, entitled PROGRAMMABLE TWO-PART MATCHED FILTER FOR SPREAD SPECTRUM, which issued as U.S. Pat. No. 5,627,855 on May 6, 1997. The benefit of the earlier filing date of the parent patent application is claimed for common subject matter pursuant to 35 U.S.C. § 120.

BACKGROUND OF THE INVENTION

This invention relates to spread spectrum communications, and more particularly to a symbol-matched filter having an intelligent power management scheme for conserving power during operation.

DESCRIPTION OF THE RELEVANT ART

Spread-spectrum communications require that an incoming spreading chip-code sequence embedded in a received-spread-spectrum signal, and the local spreading chip-code sequence at a receiver, be phase synchronized prior to processing of information transfer. Phase synchronization of the spreading chip-code sequences is commonly known as code acquisition. Code acquisition is one of the most difficult issues facing the system designer.

Code acquisition is followed by the tracking process. Due to imperfect frequency references, the incoming spreading chip-code sequence and the local spreading chip-code sequence tend to lose phase synchronization. Retaining the phase synchronization, or tracking, is a difficult process that typically employs feedback loops.

Conventional spread-spectrum systems implemented without the benefit of a matched filter employ additional circuits, such as delay locked loops (DLLs) dedicated to achieving and sustaining fine-grained phase synchronization between the local spreading code and the incoming spreading code to within a unit of time which is less than the duration of one signal sample. The circuits for sustaining fine-grain phase synchronization are difficult to design and implement.

In wireless environments, minimizing the performance degradation due to long or short duration attenuation of the incoming signal caused by changing propagation channel conditions is highly desirable. As the quality of the channel degrades, the quality of the detected signal degrades, often below acceptable levels.

Typical systems combat this condition by employing any of a variety of techniques collectively known as diversity processing. The diversity processing techniques have in common the ability to independently manipulate the information received through separate propagation paths, or channels, independently. DFFCFS The benefit from diversity processing is that when a given propagation channel degrades, the information can be recovered from signals received via other channels. A common, though expensive, diversity technique is to employ two or more separate antennas and process the signal via two or more processing chains in parallel. Although necessary, the use of two or more antennas and processing is a difficult and costly undertaking, requiring two or more times the number of circuits required for one path as well as additional circuits and processing for ensuring that the individual channel outputs are synchronized. A better approach is to employ a wideband signal of bandwidth W. If the multipath spread were $T_M$ then the receiver can recover $L=T_M(W+1)$ replicas of the incoming signal. If the receiver properly processed the replicas, then the receiver attains the performance of an equivalent $L^{th}$ order diversity communication system. For wideband systems, the value of L can become very large and it becomes unfeasible to implement L processing paths. Thus a non-matched filter receiver cannot attain the best possible performance.

The coherent demodulation of information signals requires that the phase of the carrier, at the radio frequency (RF), intermediate frequency (IF), or other frequency at which the demodulation is to take place, be known. The extraction of the phase of the carrier information requires that additional feedback loops be employed, such as phase-locked loops (PLLs), Costas loops, $n^{th}$ power loops or other devices capable of extracting the carrier phase information. In the wireless environment, where signals propagate through a multitude of separate and independent channels, each path processed by the receiver requires its own carrier phase information and therefore its own means to extract it. This requirement greatly increases the potential complexity of the system. The need to limit system complexity acts so as to limit the system performance.

Conventional receivers, for spread-spectrum reception or other coherent systems, employ circuits dedicated to extracting the carrier phase. These techniques, e.g., phase-locked loops (PLLs), Costas loops, $n^{th}$ power loops, etc., exhibit design and implementation complexities that are well documented throughout the professional literature. A separate and independent set of these circuits is implemented for each individual signal path, or channel, that is received. Practical limits on system complexity force the system to receive a small subset of the $L=T_m(W+1)$ independent signal replicas.

A complex matched filter has two identical branches, in-phase (I) and quadrature-phase (Q), used to process in-phase and quadrature-phase signals. Each branch has a local signal reference register, an incoming signal register, a multiplication layer and an adder tree. The multiplication layer and the adder tree contained in the in-phase and quadrature-phase branches are identical and may contain the majority of the gates used to implement the matched filter. When implementing a matched filter it is preferable to reduce the size of the structure as much as possible.

Processing multiple signals, whether QPSK or BPSK modulated, simultaneously by matched filtering is desirable. An example of a requirement for processing multiple signals is the simultaneous matched filter processing of the in-phase and quadrature-phase spread-spectrum signals received and then combining such signals. This normally requires the implementation of two or more matched filter structures, one per signal. Matched filters are large and difficult structures to build. Thus, limiting the size and complexity of the devices as much as possible is desirable. In this case the matched filter can be time multiplexed at two times the chip rate.

A further problem is power consumption by matched filters, and heat dissipation. Conventionally, matched filters run continuously to determine when a peak correlation occurs from a chip-code sequence. During much of this time, however, no correlation exists, since incoming chips are not positioned for a peak. This continuous running of the matched filter consumes power, a critical factor for a hand-held, battery-operated unit.

SUMMARY OF THE INVENTION

A general object of the invention is a spread-spectrum symbol-matched filter having reduced power consumption during operation.

Another object of the invention is a spread-spectrum symbol-matched filter which activates during a peak correlation of a chip sequence.

An additional object of the invention is reduced operation cost of systems designed for multiple signal processing.

A still further object of the invention is to reduce heat build-up during operation of the symbol-matched filter.

A still further object of the invention is efficient implementation of a variable processing gain apparatus to the symbol matched filter.

According to the present invention, as embodied and broadly described herein, a symbol-matched filter is provided including an in-phase-shift register, a quadrature-phase-shift register, a multiplexer, an adder tree, a plurality of AND gates, and a controller. The multiplexer is coupled to the in-phase-shift register, to the quadrature-phase-shift register and to the controller. The adder tree is coupled through the plurality of AND gates to the multiplexer.

The symbol-matched filter can be used as part of a spread-spectrum receiver, for receiving a spread-spectrum signal. A received-spread-spectrum signal, as used herein, is a spread-spectrum signal arriving at the input of the spread-spectrum receiver. Timing for the present invention may be triggered from a header as part of a packet or from a pilot-spread-spectrum channel. For the case of the header, the received-spread-spectrum signal is assumed to include a plurality of packets. Each packet has a header followed in time by data. The header and data are sent as a packet, and the timing for the data in the packet is keyed from the header. The data may contain information such as digitized voice, signalling, adaptive power control (APC), cyclic-redundancy-check (CRC)

The header, or preamble, is generated from spread-spectrum processing a header-symbol-sequence signal with a chip-sequence signal. The data part of the packet is generated from spread-spectrum processing a data-symbol-sequence signal with the chip-sequence signal. The chip-sequence signal for spread-spectrum processing the header-symbol-sequence signal and the data-symbol-sequence signal are preferably, but do not have to be, the same.

The code generator at a receiver generates a replica of the chip-sequence signal. The symbol-matched-filter has an impulse response which is matched to the chip-sequence signal of the received-spread-spectrum signal. The replica of the chip-sequence signal generated by the code generator is used to set or match the impulse response of the symbol-matched filter. When matched, upon receiving the received-spread-spectrum signal having the chip-sequence signal embedded therein, the symbol-matched filter can output the header-symbol-sequence signal and the data-symbol-sequence signal.

The replica of the header-symbol-sequence signal generated by the code generator can set the impulse response of the frame-matched filter to be matched to the header embedded in the received-spread-spectrum signal. Thus, the frame-matched filter has an impulse response, denoted herein as the frame-impulse response, which can be matched to the header-symbol-sequence signal. The start-data signal is triggered upon detecting the header in the frame-matched filter. Accordingly, the frame-matched filter filters the despread header and generates, as an output, a start-data signal in response to the header matching the frame-matched filter's impulse response.

The controller controls to which of the impulse responses the symbol-matched filter is set. The controller can cause the impulse response of the symbol-matched filter to be matched to the chip-sequence signal of the received-spread-spectrum signal. Further, the controller can generate a plurality of symbol-control signals to cause the impulse response of the symbol-matched filter to be matched, sequentially, to a plurality of chip-sequence signals, respectively. Timing to the controller can be from the start-data signal generated at the output of the frame-matched filter. Thus, in response to the start-data signal received from the frame-matched filter, the controller can cause the symbol-matched filter to be matched to the chip-sequence signal using the replica of the chip-sequence signal. At a time delay from the start-data signal, triggered from the start-data signal, the controller can cause the output of the symbol-matched filter to be sampled for data symbols.

The received-spread-spectrum signal alternatively may include a pilot-spread-spectrum channel and a data-spread-spectrum channel. The pilot-spread-spectrum channel is generated from spread-spectrum processing a pilot-bit-sequence signal with a pilot-chip-sequence signal. The data-spread-spectrum channel is generated from spread-spectrum processing a data-bit-sequence signal with a data-chip-sequence signal. From whatever spread-spectrum channel is being received, the respective spread-spectrum radio frequency (RF) and intermediate frequency (IF) receiver circuitry are assumed to output in-phase chips and quadrature-phase chips from in-phase and quadrature-phase circuits, respectively.

A code generator generates a replica of the data-chip-sequence signal. The symbol-matched filter has an impulse response which can be matched to the data-spread-spectrum signal of the received-spread-spectrum channel. The matching occurs by setting gates in an adder tree coupled to the shift registers. The replica of the data-chip-sequence signal generated by the code generator is used to set or match the impulse response, by proper settings in the adder tree of the symbol-matched filter, to the data-chip-sequence signal embedded in the received-spread-spectrum signal. When matched, upon receiving the received-spread-spectrum signal having the data-spread-spectrum channel embedded herein, the symbol-matched filter can detect and output a data-bit-sequence signal.

The in-phase-shift register shifts the in-phase chips, and the quadrature-phase-shift register shifts the quadrature-phase chips, which come from the in-phase and the quadrature-phase circuits, respectively, of the RF or IF sections of the receiver. The multiplexer multiplexes the shifted-in-phase chips and the shifted-quadrature-phase chips from the in-phase-shift register and the quadrature-phase-shift register, respectively. At the output of the multiplexer are multiplexed chips. The multiplexed chips comprise alternating sets of shifted-in-phase chips and shifted-quadrature-phase chips.

A frame-matched filter has a frame-impulse response which is matched to the block header signal. Accordingly, the frame-matched filter filters the despread-data-sequence signal and generates, as an output, a peak-correlation signal in response to the despread-data-sequence signal matching the frame-impulse response.

The controller can generate a data-control signal to cause the impulse response of the symbol-matched filter to be matched to the data-chip-sequence signal of the receivedspread-spectrum signal. Timing to the controller can be from the peak-signal generated at the output of the frame-matched filter Thus, in response to the peak-frame-matched filter signal, the controller can cause the symbol-matched filter to be matched from the replica of the data-chip-sequence signal, to the data-chip-sequence signal. At a time delay from the peak-header-correlation signal, using the block header signal, the controller can cause the symbol-matched filter to be matched from the replica of the data-chip-sequence signal, to the data-chip-sequence signal embedded in the received-spread-spectrum signal.

For either the header or pilot-spread-spectrum channel as a source of timing, the controller also can generate a POWERDOWN signal and an ACTIVATION signal. These signals may be timed from a tracking signal, the start-data signal or from a peak-frame-matched filter signal. The tracking signal is generated from a tracking circuit, which circuits are well known and used in the art for receiving a spread-spectrum signal. The POWERDOWN signal and ACTIVATION signal indicate to the controller at which point in time a correlation should be present with the symbol-matched filter. When a set of shifted-in-phase chips or a set of shifted-quadrature-phase chips of the multiplexed chips from the multiplexer have a particular-chip sequence, then the adder tree can determine a correlation is present. The correlation peaks can be timed since they are periodic, once acquisition and tracking of the received-spread-spectrum signal is achieved. Thus, during time periods when the multiplexed chips do not correlate with the adder tree, the POWERDOWN signal can inhibit the adder tree from activation. At a time when the multiplexed chips can achieve a correlation with the adder tree, then the controller can output the ACTIVATION signal, activating the adder tree. During time intervals when the POWERDOWN signal is present, the gates of the adder tree are not active, and power is not being dissipated by the gates of the adder tree.

The adder tree has settings, which determine when there is a correlation from given taps of the shift registers, or the multiplexer. A plurality of AND gates can be coupled between the multiplexer and the adder tree, and to the controller, and used to inhibit or activate the adder tree, depending on whether a POWERDOWN signal or a ACTIVATION signal, respectively, is generated from the controller.

The present invention also includes a method for using a symbol-matched filter and a frame-matched filter as part of a spread-spectrum receiver on a received-spread-spectrum signal. As with the spread-spectrum-matched-filter apparatus set forth above, the received-spread-spectrum signal is assumed to include a header followed in time by data. The header and data are sent as a packet, and timing of the packet is triggered, for each packet, off the detected header.

The header is generated from spread-spectrum processing a header-bit-sequence signal with a chip-sequence signal. The data are spread-spectrum processed as a data-symbol-sequence signal with the chip-sequence signal. The chip-sequence signal for spread-spectrum processing the header-bit sequence signal and the data-symbol-sequence signal are preferably, but do not have to be, the same.

The steps include generating a replica of the chip-sequence signal, and programming, using the replica of the chip-sequence signal, the symbol-matched filter to have an impulse response matched to the chip-sequence signal. When the symbol-matched filter is matched to the chip-sequence signal, the method includes the steps of despreading the header from the received-spread-spectrum signal as a despread-header-symbol-sequence signal, and filtering with the frame-matched filter, the despread-header-symbol-sequence signal and generating a start-data signal.

When the symbol-matched filter is matched to the chip-sequence signal, the output of the symbol-matched filter is sampled at a time delay triggered from the detected header. The steps include despreading the spread-spectrum-processed data-symbol-sequence signal from the received-spread-spectrum signal as a despread-data-symbol-sequence signal.

The present invention also includes a method for controlling power in a symbol-matched filter and a frame-matched filter as part of a spread-spectrum receiver. As with the spread-spectrum-matched-filter apparatus set forth above, the received-spread-spectrum signal includes a header and a dataspread-spectrum channel. The data-spread-spectrum channel is generated from spread-spectrum processing a data-bit-sequence signal with a data-chip-sequence signal.

The steps include generating a replica of the data-chip-sequence signal, and programming, using the replica of the data-chip-sequence signal, the symbol-matched filter to have an impulse response matched to the data-chip-sequence signal. When the symbol-matched filter is matched to the chip-sequence signal, the method includes the steps of despreading the pilot-spread-spectrum channel from the received-spread-spectrum signal as a despread-pilot-bit-sequence signal, and filtering with the frame-matched filter the despread-pilot-bit-sequence signal and generating a peak-pilot-correlation signal. When the symbol-matched filter is matched to the data-chip-sequence signal, the steps include despreading the data-spread-spectrum channel from the received-spread-spectrum signal as a despread-data-bit-sequence signal with a header that can be detected by the frame-matched filter.

Using either a header or pilot-spread-spectrum channel for timing, the method for controlling power in the symbol-matched filter includes the steps of shifting in-phase chips through an in-phase register, and shifting quadrature-phase chips through a quadrature-phase register. The shifted-in-phase chips are multiplexed with shifted quadrature-phase chips, to generate multiplexed chips. In response to tracking and acquiring the received-spread-spectrum signal, a POWERDOWN signal is generated when the multiplexed chips do not correlate with the settings of the adder tree, and an ACTIVATION signal is generated when the multiplexed chips correlate with the settings of the adder tree. The multiplexed chips pass through the adder tree when the ACTIVATION signal is present, but are inhibited from passing to the adder tree when the POWERDOWN signal is present. POWERDOWN and ACTIVATION signals are essentially combined in to a single signal; when the signal is low, activation is accomplished and when high, powerdown is effected.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Figure 1:
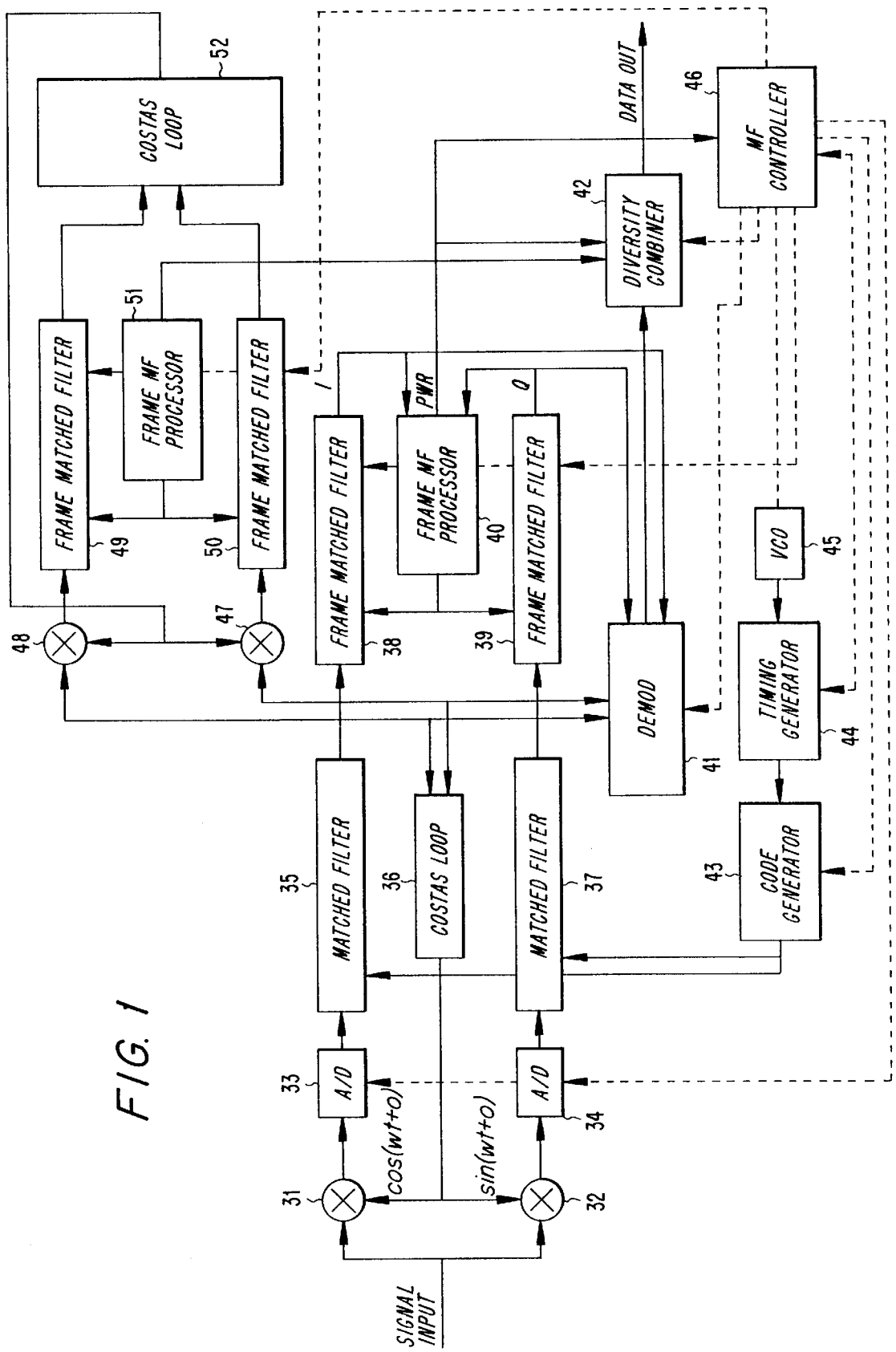
FIG. 1 is a block diagram of a signal-time-sharing, matched-filter-based demodulator.

Reference now is made in detail to the present preferred embodiments of the invention, examples of which are illustrated in the accompanying drawings, wherein like reference numerals indicate like elements throughout the several views.

The present invention provides a new and novel spread-spectrum-matched-filter apparatus which can be used as part of a spread-spectrum receiver on a received-spread-spectrum signal. The received-spread-spectrum signal, in a preferred embodiment, is assumed to include a plurality of packets. Each packet has a header followed in time by data. The header is generated from spread-spectrum processing, by using techniques well known in the art, a header-symbol-sequence signal with a chip-sequence signal. The header-symbol-sequence signal is a predefined sequence of symbols. The header-symbol-sequence signal may be a constant value, i.e., just a series of 1-bits or symbols, or a series of 0-bits or symbols, or alternating 1-bits and 0-bits or alternating symbols, a pseudorandom symbol sequence, or other predefined sequence as desired. The chip-sequence signal is user defined, and in a usual practice, is used with a header-symbol-sequence signal.

The data part of the spread-spectrum packet is generated similarly, from techniques well known in the art as used for the header, by spread-spectrum processing a data-symbol-sequence signal with the chip-sequence signal. The data-symbol-sequence signal may be derived from data, or an analog signal converted to data, signalling information, or other source of data symbols or bits. The chip-sequence signal can be user defined, and preferably is nearly orthogonal to other spread-spectrum channels using the chip-sequence signal, as is well known in the art.

The present invention alternatively may operate on a received-spread-spectrum signal, which is assumed to have a data-spread-spectrum channel. The pilot-spread-spectrum channel is generated from spread-spectrum processing, by using techniques well known in the art, a pilot-bit-sequence signal with a pilot-chip-sequence signal. The pilot-bit-sequence signal may be a constant level, i.e., just a series of 1-bits, or a series of 0-bits, or alternating 1-bits and 0-bits, or other sequence as desired. Typically, data are not sent with a pilot-bit-sequence signal. In some applications, data, preferably with a low data rate, may be imposed on the pilot-bit-sequence signal. The pilot-chip-sequence signal is user-defined, and in a usual practice, is used with a pilot-bit-sequence signal.

The data-spread-spectrum channel is generated similarly, from techniques well known in the art, by spread-spectrum processing a data-bit-sequence signal with a data-chip-sequence signal. The data-bit-sequence signal may be derived from data, or analog signal converted to data, or other source of data bits. The data-chip-sequence signal can be user-defined, and preferably is orthogonal to other users' chip sequence signal, as is well known in the art.

Broadly, the spread-spectrum-matched-filter apparatus includes code means, symbol-matched means, frame-matched means, control means, and demodulator means. The control means is coupled to the code means and symbol-matched means. The frame-matched means is coupled to the output of the symbol-matched means. The demodulator means is coupled to the output of the symbol-matched means. The prefix "symbol" is used to denote those means or components which operate on detecting or processing a data symbol or a header symbol from the received-spread-spectrum signal. The prefix "frame" is used to denote those means or components which operate on detecting or processing a data symbol, synchronization symbol such as from a header or pilot channel, outputted from the symbol-matched means or devices embodying the symbol-matched means.

The following description discusses the symbol-matched filter using a header and using a pilot channel, then the intelligent power management scheme for use with a matched filter.

Programmable Matched Filter Using a Header

For an embodiment using packets, and headers for synchronization, the code means generates a replica of the chip-sequence signal. The replica of the chip-sequence signal is the same sequence as used for generating, at a spread-spectrum transmitter, the received-spread-spectrum signal which arrives at the input of the spread-spectrum-matched-filter apparatus. The code means can change, over time, the particular chipping sequence from which the replica of the chip-sequence signal is generated. Accordingly, the spread-spectrum-matched-filter apparatus can be used for a variety of chip-sequence signals as generated by the code means, as might be used in a cellular-spread-spectrum architecture where a receiver might move from one geographical area to another. As the spread-spectrum-matched-filter apparatus moves from one geographical area to another, by way of example, a requirement might be imposed to change the chip-sequence signal in each of the different geographical areas. Similarly, each transmitter within the geographical area of a base station may have a different chip-code sequence.

For the embodiment using a header for synchronization, the symbol-matched means has a symbol-impulse response. The symbol-impulse response can be set from the replica of the chip-sequence signal generated by the code means. Thus, the symbol-impulse response may be set for filtering from the received-spread-spectrum signal, the header and the data-symbol-sequence signal. With the symbol-impulse response set to the replica of the chip-sequence signal, and with the header portion of the received-spread-spectrum-signal being present at the receiver, the symbol-matched means outputs a despread-header-symbol-sequence signal. Upon detecting the despread-header-symbol sequence, the frame-matched means outputs a high level signal which may be used as a start-data signal. Other uses may be to synchronize the sequence of transmit, switching and receive cycles or to generate a timing signal for any other event that is related in time to the header.

The symbol-matched means continues to have the symbol-impulse response set from the replica of the chip-sequence signal When the data portion of the received-spread-spectrum signal is present at the receiver, the symbol-matched means filters the received-spread-spectrum signal. Timing to sample the data portion of the received-spread-spectrum signal is triggered from the start-data signal. Thus, the symbol-matched means outputs the despread-data-symbol-sequence signal. Accordingly, the symbol-matched means can despread the header and the data portion of the received-spread-spectrum signal.

For the embodiment using the header for synchronization, the frame-matched means has a frame-impulse response matched to the header-symbol-sequence signal. Thus, the frame-matched means filters the despread-header-symbol-sequence signal from the symbol-matched means, and generates as a result thereof, a start-data signal when the despread-header-symbol-sequence signal matches the frame-impulse response. The frame-matched means may be programmable, i.e., have a programmable frame-impulse response, which might change between different geographical areas.

The control means controls the setting of the symbol-impulse response of the symbol-matched means. The control means can dynamically set the symbol-matched means, by using the replica of the chip-sequence signal generated by the code means, to match the chip-sequence signal embedded in the received-spread-spectrum signal.

The symbol-matched means may include an in-phase-symbol-matched means and a quadrature-phase-symbol-matched means. The in-phase-symbol-matched means has an in-phase-symbol-impulse response which can be set from the replica of the chip-sequence signal generated by the code means. Depending on which setting the in-phase-symbol-matched means has, the in-phase-symbol-matched means despreads from the received-spread-spectrum signal, an in-phase-component of the header portion of the packet as a despread-in-phase-component of the header-symbol-sequence signal, or an in-phase component of the data portion of the packet as a despread-in-phase component of the data-symbol-sequence signal.

The quadrature-phase-symbol-matched means has a quadrature-impulse response which can be set from the replica of the chip-sequence signal generated by the code means. When the quadrature-phase-symbol-matched means has the quadrature-impulse response matched to the chip-sequence signal, the quadrature-phase-symbol-matched means despreads from the received-spread-spectrum signal a quadrature-phase component of the header portion of the packet as a despread-quadrature-phase component of the header-symbol-sequence signal. Similarly, when the quadrature-phase-symbol-matched means has the quadrature-symbol-impulse response set from the replica of the chip-sequence signal, the quadrature-phase-symbol-matched means despreads the received-spread-spectrum signal as a quadrature-component of the data portion of the packet as a despread-quadrature-phase component of the despread data-symbol-sequence.

In use, the control means sets the in-phase-symbol-matched means and the quadrature-phase-symbol-matched means matched to detect the chip-sequence signal. The in-phase-symbol-matched means and the quadrature-phase-symbol-matched means are matched simultaneously, and preferably are matched to the same chip-sequence signal.

The frame-matched means may include an in-phase-frame-matched means and a quadrature-phase-frame-matched means. The in-phase-frame-matched means has an in-phase-frame-impulse response matched to an in-phase component of the header-symbol-sequence signal. When the in-phase component of the despreadheader-symbol-sequence signal from the in-phase-symbol-matched means matches the in-phase-frame-impulse response, then an in-phase-start-data signal is generated.

The quadrature-phase-frame-matched means has a quadrature-phase-frame-impulse response matched to a quadrature-phase component of the header-symbol-sequence signal. When the quadrature-phase component of the despread-header-symbol-sequence signal matches the quadrature-phase-frame-impulse response of the quadrature-phase-frame-matched means, then a quadrature-phase-start-data signal is generated. In practice, the in-phase-start-data signal and the quadrature-phase-start-data signal are generated simultaneously, but they may also occur at different times.

The in-phase-start-data signal and the quadrature-phase-start data signal are combined as the start-data signal. Timing for sampling the output of the in-phase-symbol-matched means and the quadrature-phase-symbol-matched means for detecting the data-symbol-sequence signal is triggered, at a time delay, from the start-data signal. The time delay may be zero.

In the exemplary arrangement shown in FIG. 1, the code means is embodied, by way of example, as a code generator 43, the symbol-matched means is embodied as an in-phase-symbol-matched filter 35 and a quadrature-phase symbol-matched filter 37, the frame-matched means is embodied as an in-phase-frame-matched filter 38 and a quadrature-phase-frame-matched filter 39, the control means is embodied as a controller 46, and the demodulator means is embodied as a demodulator 41. The in-phase-symbol-matched filter 35 and the quadrature-phase-symbol-matched filter 37 may be constructed as digital-matched filters, surface-acoustic-wave devices, or as software embedded in a processor or as an application specific integrated circuit (ASIC). Also shown is a voltage-controlled oscillator 45, timing generator 44, diversity combiner 42, frame processor 40, Costas loop 36 or other generic tracking loop, in-phase analog-to-digital converter 33, quadrature-phase analog-to-digital converter 34, in-phase mixer 31, and quadrature-phase mixer 32.

The in-phase analog-to-digital converter 33 is coupled between in-phase mixer 31 and in-phase-symbol-matched filter 35. The quadrature-phase analog-to-digital converter 34 is coupled between the quadrature-phase mixer 32 and the quadrature-phase-symbol-matched filter 37. The Costas loop 36 is coupled to the output of the in-phase-symbol-matched filter 35, to the output of the quadrature-phase-symbol-matched filter 37, and to the in-phase mixer 31 and the quadrature-phase mixer 32. The in-phase-frame-matched filter 38 is coupled between the in-phase-symbol-matched filter 35 and the frame processor 40 and the demodulator 41. The quadrature-phase-frame-matched filter 39 is coupled between the quadrature-phase-symbol-matched filter 37 and the processor 40 and the demodulator 41. The code generator 43 is coupled between the timing generator 44 and the in-phase-symbol-matched filter 35 and the quadrature-phase-frame-matched filter 37. The timing control circuit controls the sampling instant of the analog-to-digital converter timing generator 44 to the in-phase-symbol-matched filter 35 and the quadrature-phase-symbol-matched filter 37. The voltage-controlled oscillator 45 is coupled to the timing generator 44 and to the matched-filter controller 46. The diversity combiner 42 is coupled to the frame processor 40 and the demodulator 41. The controller 46 is coupled to the frame processor 40. The prefixes "in-phase" and "quadrature-phase" denote that component, i.e., in-phase or quadrature-phase, of the received-spread-spectrum signal, with which the element operates.

The in-phase analog-to-digital converter 33 and the quadrature-phase analog-to-digital converter 34 may be embodied as a hard limiter which performs one-bit analog-to-digital conversion, or as an N-bit analog-to-digital converter. Analog-to-digital converters are well known in the art.

For control, indicated by broken lines, the controller 46 is coupled to the diversity combiner 42, the frame-matched filter 38, the frame-matched filter 39, the demodulator 41, the timing generator 44, the code generator 43, the in-phase-analog-to-digital converter 33, and the quadrature-phase-analog-to-digital converter 34.

For RAKE applications, additional sections of frame-matched filters would be required. Thus, an additional in-phase mixer 48 and quadrature-phase mixer 47, and in-phase-frame-matched filter 49 and quadrature-phase-frame-matched filter 50 would be used with a second frame-matched-filter processor 51 and Costas loop 52. The application RAKE is well known in the art, and thus the addition of the additional frame-matched filter section would be easily recognizable to those skilled in the art.

Referring to FIG. 1, a received-spread-spectrum signal at the signal input is translated to an intermediate frequency or baseband frequency by in-phase mixer 31 and quadrature-phase mixer 32. For discussion purposes, the received-spread-spectrum signal is assumed to be translated to a baseband frequency. The portion of the spread-spectrum receiver which includes low noise amplifiers, automatic-gain-control (AGC) circuits, filters, etc., is well known in the art, and therefore, is not shown. The baseband received-spread-spectrum signal is converted to a digital signal by in-phase analog-to-digital converter 33 and quadrature-phase analog-to-digital converter 34. Thus, a baseband version of the received-spread-spectrum signal is at the input of the in-phase-symbol-matched filter 35 and the quadrature-phase-symbol-matched filter 37.

The in-phase-symbol-matched filter 35 has an in-phase-symbol-impulse response which is set by the replica of the chip-sequence signal from code generator 43. Depending on the setting, the in-phase-symbol-matched filter 35 can despread the received-spread-spectrum signal as a despread-in-phase component of the header-symbol-sequence signal or as a despread-in-phase component of the spread-spectrum-processed data-symbol-sequence signal. Accordingly, the in-phase-symbol-matched filter 35 outputs either a despread-in-phase component of the header-symbol-sequence signal, or a despread-in-phase component of the spread-spectrum-processed data-symbol-sequence signal as a despread-in-phase-data-symbol-sequence signal.

Similarly, the quadrature-phase-symbol-matched filter 37 has a symbol-impulse response which can be set by the replica of the chip-sequence signal generated by the code generator 43. Depending on the setting, the quadrature-phase-symbol-matched filter 37 despreads the received-spread-spectrum signal as a quadrature-phase component of the header-symbol-sequence signal or as a quadrature-phase component of the spread-spectrum-processed data-symbol-sequence signal. Accordingly, the output of the quadrature-phase-symbol-matched filter 37 is either a despread-quadrature-phase component of the header-symbol-sequence signal or a despread-quadrature-phase component of the spread-spectrum-processed data-symbol-sequence signal as a despread-quadrature-phase-data-symbol-sequence signal.

The in-phase-symbol-matched filter 35 and the quadrature-phase-symbol-matched filter 37 are ultimately controlled by the controller 46. The controller 46 controls timing and determines at desired timings when the code generator 43 sets the symbol-impulse responses of the in-phase-symbol-matched filter 35 and the quadrature-phase-symbol-matched filter 37 to the respective chip-sequence signal being used in a particular geographic area.

Figure 2:
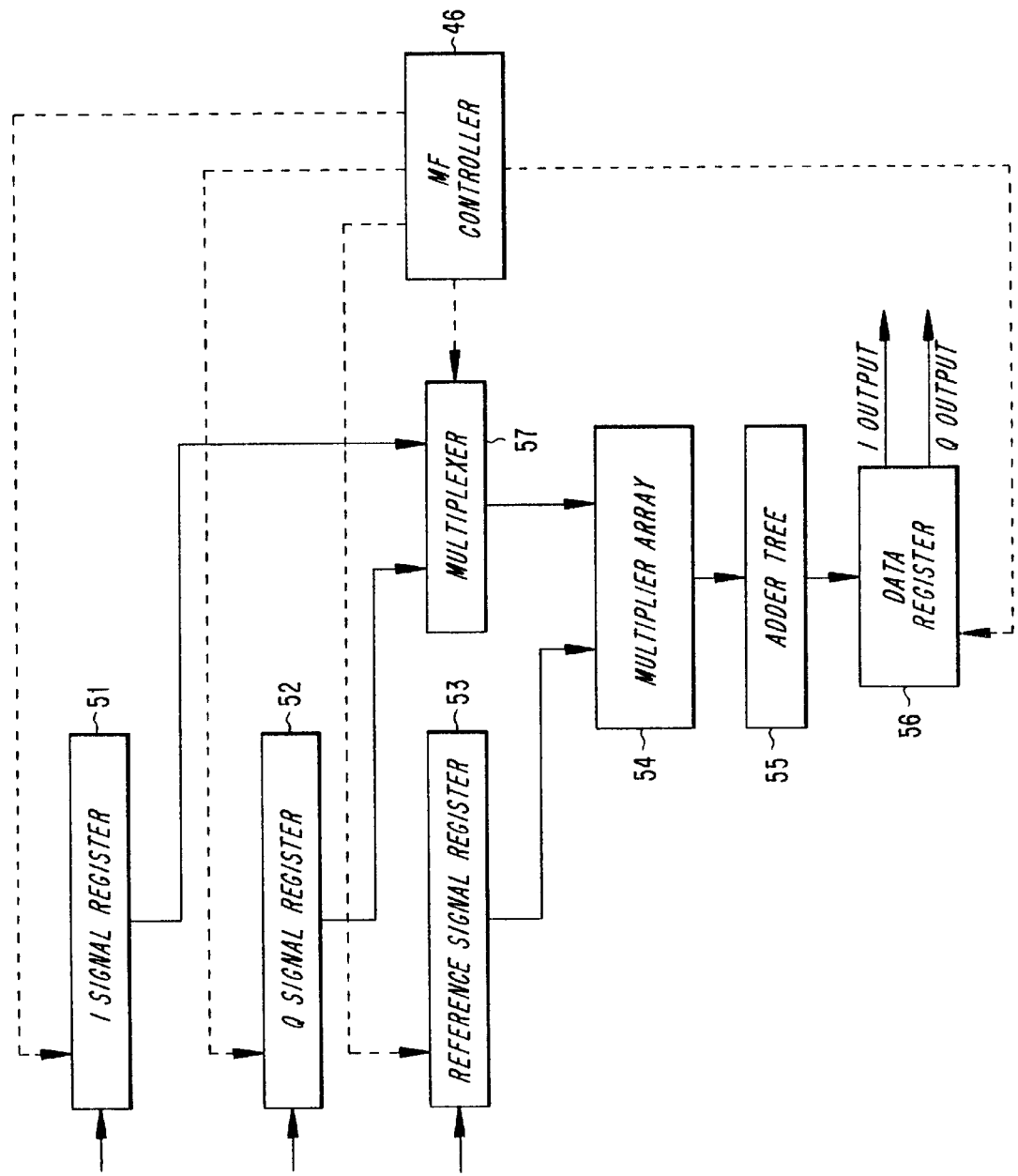
FIG. 2 illustrates a matched filter using time sharing of multiplier array and adder tree.

As shown in FIG. 2, the controller 46 controls the in-phase signal register 51 and the quadrature-phase signal register 52, which correspond to the in-phase-symbol-matched filter 35 and the quadrature-phase-symbol-matched filter 37, respectively.

In FIG. 1, the Costas loop 36 uses the output from the in-phase-symbol-matched filter 35 and the output from the quadrature-phase-symbol-matched filter 37 to generate the cosine signal and sine signal for in-phase mixer 31 and quadrature-phase mixer 32, respectively.

The spread-spectrum receiver receives packets of header and data, which may arrive as a stream of uninterrupted packets in a frequency division duplex (FDD) application, or as separate packets in a time division duplex (TDD) application. The despread and detected header provides timing and synchronization for data within a respective packet.

Figure 3:
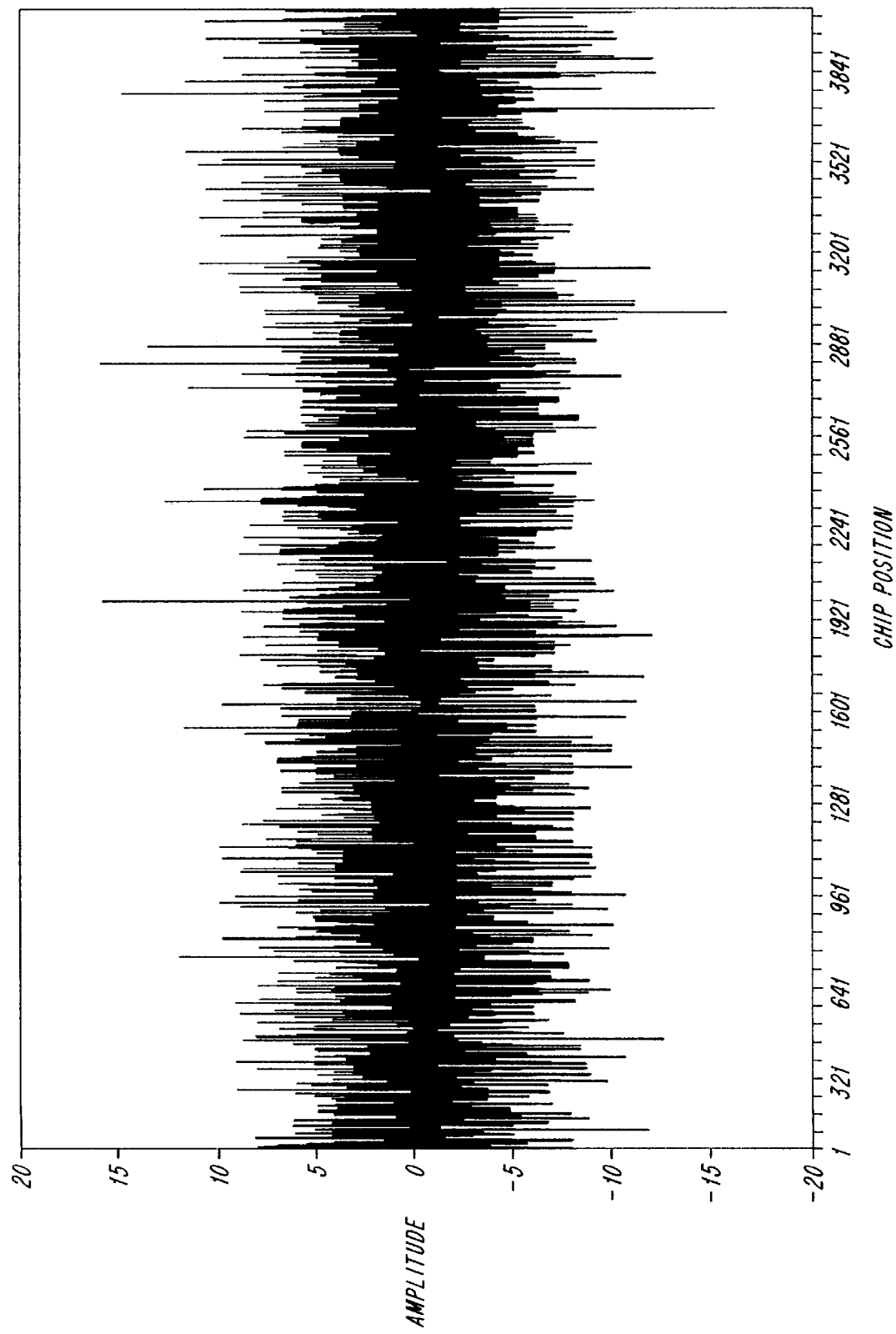
FIG. 3 is an example output signal from the symbol-matched filter.
Figure 4:
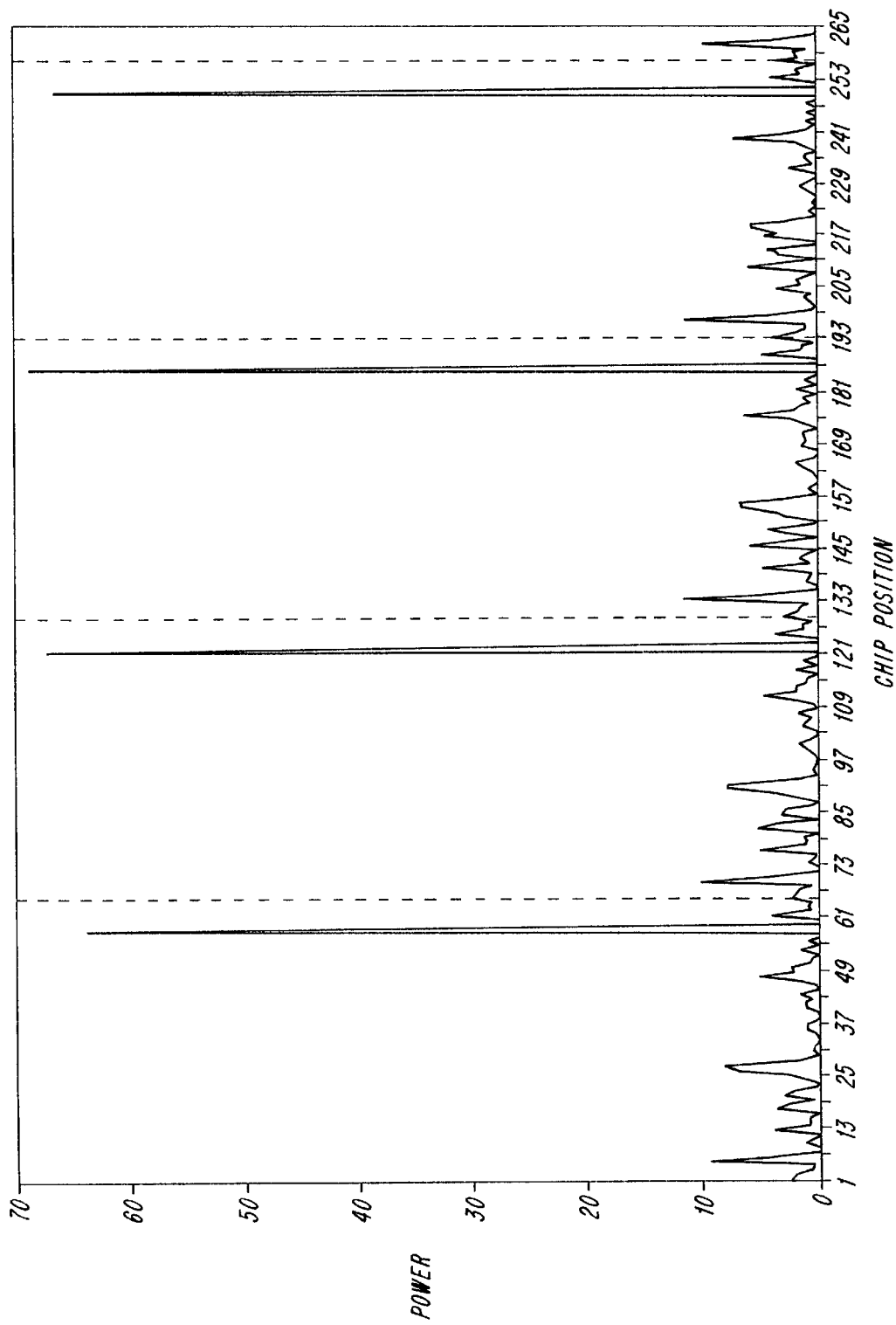
FIG. 4 is an example output signal from the frame-matched filter.

When the in-phase-symbol-matched filter 35 and quadrature-phase-symbol-matched filter 37 have their respective symbol-impulse responses matched to the chip-sequence signal, and the header portion of the packet of the received-spread-spectrum signal is present at the receiver input, then the output is a despread-header-symbol-sequence signal. An example of a signal outputted as a despread-header-symbol-sequence signal is illustrated in FIG. 3. The despread-header-symbol-sequence signal is passed through in-phase-frame-matched filter 38 and quadrature-phase-frame-matched filter 39. The in-phase-frame-matched filter 38 has an in-phase-frame-impulse response matched to the in-phase component of the header-symbol-sequence signal, and accordingly, generates an in-phase-start-data signal when the in-phase component of the despread-header-symbol-sequence signal matches the in-phase-frame-impulse response. Similarly, the quadrature-phase-frame-matched filter 39 has a quadrature-phase-frame-impulse response matched to a quadrature-phase component of the header-symbol-sequence signal. When the despread-header-symbol-sequence signal from the quadrature-phase-symbol-matched filter 37 matches the quadrature-phase-frame-impulse response of the quadrature-phase-matched filter 37, then the quadrature-phase-frame-matched filter outputs a quadrature-phase-start-data signal. An example of a signal outputted from the frame-matched filter is illustrated in FIG. 4. The large spike's, i.e., large signal levels, are the start-data signal referred to herein. These spikes or start-data signals serve as timing references to synchronize timing, as disclosed herein. The in-phase-start-data signal and the quadrature-phase-start-data signal are demodulated by demodulator 41, and can be used as an initial timing signal for controlling when the diversity combiner 42 combines the output from the demodulator 41 for the respective signals from in-phase-symbol-matched filter 35 and the quadrature-phase-symbol-matched filter 37.

Additionally, the in-phase-start-data signal and the quadrature-phase-start-data signal can be processed by frame processor 40 to trigger a timing signal, i.e., the start-data signal, to the controller 46 which actuates the timing for when to sample the outputs of the in-phase-symbol-matched filter 35 and the quadrature-phase-symbol-matched filter 37, for detecting the data-symbol-sequence signal.

In a particular implementation of the present invention, the in-phase-symbol-matched filter 35 and the quadrature-phase-symbol-matched filter 37 have their respective in-phase-symbol-impulse response and quadrature-phase-symbol-impulse response determined, under the control of the controller 46, such that they are matched to the chip-sequence signal within 6.4 microseconds (64 chips at 10 Mchips/sec). Typically, current designs have these respective symbol-matched filters loaded within 12.8 microseconds, for a system operating at 100 MHz, with each of the in-phase-symbol-matched filter 35 and the quadrature-phase-symbol-matched filter 37 having a 256 stage shift register (256 chips at 20 Mchips/sec).

The demodulator 41 can be implemented using coherent demodulation, or alternatively using noncoherent demodulation.

The diversity combiner 42 combines in a variety of ways, such as maximum likelihood, straight combining, addition, or the demodulated outputs from the in-phase-symbol-matched filter 35 and the quadrature-phase-symbol-matched filter 37 as demodulated through demodulator 41.

FIG. 2 illustrates the matched filter using the time sharing of the multiplier array and adder tree. Shown in FIG. 2 are in-phase-signal register 51, quadrature-phase-signal register 52, reference-signal register 53, multiplier array 54, adder tree 55, data register 56, and controller 46. As shown, the dotted lines indicate that the controller 46 provides the necessary controlling of the in-phase-signal register 51, the quadrature-phase-signal register 52, the reference-signal reference 53 and the data register 56. The solid lines indicate the signal flow from the in-phase-signal register 51, the quadrature-phase-signal register 52, the reference-signal register 53 through the multiplexer 57. The in-phase-signal register 51 and the quadrature-phase-signal register 52 are coupled through multiplexer 57 to multiplier array 54 to adder tree 55 to data register 56. The data register 56 has an in-phase output and quadrature-phase output.

The present invention also includes a method which uses a symbol-matched filter and a frame-matched filter with a spread-spectrum receiver on a received-spread-spectrum signal. As with the apparatus previously disclosed, the received-spread-spectrum signal is assumed to have a plurality of packets, with each packet including a header and data portion. The header is generated from spread-spectrum processing a header-symbol-sequence signal with a chip-sequence signal. The data portion of the packet is generated from spread-spectrum processing a data-symbol-sequence signal with the chip-sequence signal.

The method comprises the steps of generating a replica of the chip-sequence signal. The method programs the symbol-matched filter with the replica of the chip-sequence signal to set the symbol-matched filter to have a symbol-impulse response matched to the chip-sequence signal. With the symbol-matched filter matched to the chip-sequence signal, the method despreads the header portion of the packet from the received-spread-spectrum signal as a despread header-symbol-sequence signal.

The frame-matched filter has a frame-impulse response matched to the header-symbol-sequence signal. The method therefore uses the frame-matched filter to filter the despread header-symbol-sequence signal. The method thereafter generates from the filtered despread-header-symbol-sequence signal, the data-start signal in response to the despread-header-symbol-sequence signal matching the frame-impulse response of the frame-matched filter.

The method also generates at a time delay from the data-start signal, a data-control signal. The time delay may be zero. In response to the data-control signal, the method programs the frame-matched filter with the replica of the data-chip-sequence signal so that the frame-matched filter has the frame-impulse response matched to the data-symbol-sequence signal. The method thereby despreads, while the frame-matched filter is matched to the data-symbol-sequence signal, the data-spread-spectrum channel from the received-spread-spectrum signal as a despread-data-symbol-sequence signal.

The method as described herein may be extended to in-phase and quadrature-phase components of a received-spread-spectrum signal. As such, the method would have the step of despreading the header portion of the packet from the received-spread-spectrum signal including the steps of despreading, from the received-spread-spectrum signal, the in-phase component of the header as a despread in-phase component of the header-symbol-sequence signal, and despreading, from the received-spread-spectrum signal, the quadrature-phase component of the header as a despread-quadrature-phase component of the header-symbol-sequence signal.

Similarly, the in-phase component and the quadrature-phase component of the received-spread-spectrum signal can be despread as in-phase components and quadrature-phase components of the data-symbol-sequence signal. Accordingly, the method would include despreading, from the received-spread-spectrum signal, an in-phase component of the data portion of the packet as a despread-in-phase component of the data-symbol-sequence signal. The method would also include despreading a quadrature-phase component of the data portion of the packet as a despread-quadrature-phase component of the data-symbol-sequence signal.

When filtering the despread header-symbol-sequence signal into in-phase components and quadrature-phase components, the method can also include generating an in-phase-start-data signal and a quadrature-phase-start-data signal, in response to the in-phase component and the quadrature-phase component of the despread header-symbol-sequence signal matching the in-phase-frame-impulse response and the quadrature-phase-frame-impulse response, respectively.

Programmable Matched Filter Using a Pilot Channel

For an embodiment using a pilot-spread-spectrum channel for synchronization, the code means generates a replica of the pilot-chip-sequence signal and the data-chip-sequence signal. These replicas of the pilot-chip-sequence signal and the data-chip-sequence signal are the same sequences as used for generating the received-spread-spectrum signal which arrives at the input of the spread-spectrum-matched-filter apparatus. The code means can change, over time, the particular chipping sequence from which the replica of the data-chip-sequence signal is generated. Accordingly, the spread-spectrum-matched-filter apparatus can be used for a variety of data-chip-sequence signals as generated by the code means, as might be used in a cellular-spread-spectrum architecture where a receiver might move from one geographical area to another. As the spread-spectrum-matched-filter apparatus moves from one geographical area to another, by way of example, a requirement might be imposed of having to change the pilot-chip-sequence signal and the data-chip-sequence signal in each of the different geographical areas.

For the embodiment using the pilot-spread-spectrum channel for synchronization, the symbol-matched means has an impulse response which is programmable, denoted herein as the symbol-impulse response. The symbol-impulse response can be set from the replica of the data-chip-sequence signal generated by the code means. Thus, the symbol-impulse response may be set for filtering from the received-spread-spectrum signal, the header and data. With the symbol-impulse response set to the replica of the pilot-chip-sequence signal, and with the pilot-spread-spectrum channel at the receiver, the symbol-matched means outputs a despread-pilot-bit-sequence signal.

When the symbol-matched means has the symbol-impulse response set from the replica of the data-chip-sequence signal, then the symbol-matched means filters from the received-spread-spectrum signal, the data-spread-spectrum channel. Thus, the symbol-matched means can output the despread-data-bit-sequence signal, which includes the header, signalling, APC data, etc. Accordingly, the symbol-matched means can despread the data-spread-spectrum channel. As set forth below, the symbol-matched means changes dynamically, while receiving the received-spread-spectrum signal, allowing the symbol-matched means to be time shared while receiving the in-phase chip sequence signal and the quadrature-phase chip-sequence signal.

For the embodiment using the pilot spread-spectrum channel for synchronization, the frame-matched means has a frame-impulse response matched to the symbol-matched filter output. Thus, the frame-matched means filters the despread-pilot-bit-sequence signal from the symbol-matched means, and generates as a result thereof, a peak-correlation signal when the despread-pilot-bit-sequence signal matches the frame-impulse response. The frame-matched means may have a programmable-frame-impulse response, which might change between different geographical areas or for different users.

The control means controls the setting of the symbol-impulse response of the symbol-matched means. The control means can dynamically set the symbol-matched means, by using the replica of the pilot-chip-sequence signal generated by the code means, to match the pilot-chip-sequence signal embedded in the received-spread-spectrum signal. The control means can dynamically set the symbol-matched means, by using the replica of the data-chip-sequence signal generated by the code means, to match the data-chip-sequence signal. The control means can set the symbol-impulse response alternately, at various time delays, so that the symbol-matched means alternately detects the in-phase sequence signal and the quadrature-phase sequence signal embedded in the received-spread-spectrum signal.

The symbol-matched means may include an in-phase-symbol-matched means and a quadrature-phase-symbol-matched means. The in-phase-symbol-matched means has an in-phase-symbol-impulse response which can be set from the replica of the data-chip-sequence signal generated by the code means. Depending on which setting the in-phase-symbol-matched means has, the in-phase-symbol-matched means despreads from the received-spread-spectrum signal, an in-phase-component of the pilot-spread-spectrum signal channel as a despread-in-phase-component of the pilot-bit-sequence signal, or an in-phase component of the data-spread-spectrum channel as a despread-in-phase component of the data-bit-sequence signal.

The quadrature-phase-symbol-matched means has a quadrature-impulse response which can be set from the replica of the data-chip-sequence signal generated by the code means. When the quadrature-phase-symbol-matched means has the quadrature-impulse response matched to the pilot-chip-sequence signal, the quadrature-phase-symbol-matched means despreads from the received-spread-spectrum signal a quadrature-phase component of the pilot-spread-spectrum channel as a despread-quadrature-phase component of the pilot-bit-sequence signal. Similarly, when the quadrature-phase-symbol-matched means has the quadrature-symbol-impulse response set from the replica of the data-chip-sequence signal, the quadrature-phase-symbol-matched means despreads the received-spread-spectrum signal as a quadrature-component of the data-spread-spectrum channel as a despread-quadrature-phase component of the despread data-bit-sequence.

In use, the control means has the in-phase-symbol-matched means and the quadrature-phase-symbol-matched means time synchronized so that they are matched to detect the data-chip-sequence signal. This dynamic changing of the in-phase-symbol-matched means and the quadrature-phase-symbol-matched means is done alternately during reception of a spread-spectrum signal, time sharing these elements for detecting the data-chip-sequence signal embedded in the received-spread-spectrum signal. The frame-matched means may include an in-phase-frame-matched means and a quadrature-phase-frame-matched means. The in-phase-frame-matched means has an in-phase-frame-impulse response matched to an in-phase component of the header-bit-sequence signal. When the in-phase component of the despread-pilot-bit-sequence signal from the in-phase-symbol-matched means matches the in-phase-frame-impulse response, then an in-phase-peak-header-correlation signal is generated.

The quadrature-phase-frame-matched means has a quadrature-phase-frame-impulse response matched to a quadrature-phase component of the header-bit-sequence signal. When the quadrature-phase component of the despread-header-bit-sequence signal matches the quadrature-phase-frame-impulse response of the quadrature-phase-frame-matched means, then a quadrature-phase-peak-header-correlation signal is generated.

In the exemplary arrangement shown in FIG. 1, the code means is embodied as a code generator 43, the symbol-matched means is embodied as an in-phase-symbol-matched filter 35 and a quadrature-phase symbol-matched filter 37, the frame-matched means is embodied as an in-phase-frame-matched filter 38 and a quadrature-phase-frame-matched filter 39, the control means is embodied as a controller 46, and the demodulator means is embodied as a demodulator 41. The in-phase-symbol-matched filter 35 and the quadrature-phase-symbol-matched filter 37 may be constructed as digital-matched filters, surface-acoustic-wave devices, or as software embedded in a processor or as an application specific integrated circuit (ASIC). Also shown is a voltage-controlled oscillator 45, timing generator 44, diversity combiner 42, frame processor 40, Costas loop 36 (or other generic tracking loop), in-phase analog-to-digital converter 33, quadrature-phase analog-to-digital converter 34, in-phase mixer 31, and quadrature-phase mixer 32.

The in-phase analog-to-digital converter 33 is coupled between in-phase mixer 31 and in-phase-symbol-matched filter 35. The quadrature-phase analog-to-digital converter 34 is coupled between the quadrature-phase mixer 32 and the quadrature-phase-symbol-matched filter 37. The Costas loop 36 is coupled to the output of the in-phase-symbol-matched filter 35, to the demodulator 41, and to the in-phase mixer 31 and the quadrature-phase mixer 32. The in-phase-frame-matched filter 38 is coupled between the in-phase-symbol-matched filter 35 and the frame processor 40 and the demodulator 41. The quadrature-phase-frame-matched filter 39 is coupled between the quadrature-phase-symbol-matched filter 37 and the processor 40 and the demodulator 41. The code generator 43 is coupled between timing generator 44 and to the in-phase-symbol-matched filter 35 and the quadrature-phase-symbol-matched filter 37. The voltage controlled oscillator 45 is coupled to the timing generator 44 and to the matched-filter controller 46. The diversity combiner 42 is coupled to the frame processor 40 and the demodulator 41. The controller 46 is coupled to the frame processor 40. The prefixes "in-phase" and "quadrature-phase" denote that component, i.e., in-phase or quadrature-phase, of the received-spread-spectrum signal, with which the element operates.

The in-phase analog-to-digital converter 33 and the quadrature-phase analog-to-digital converter 34 may be embodied as a hard limiter which performs one-bit analog-to-digital conversion, or as an N-bit analog-to-digital converter. Analog-to-digital converters are well known in the art.

For control, indicated by broken lines, the controller 46 may be coupled to the diversity combiner 42, the in-phase-frame-matched filter 38, the quadrature-phase-frame-matched filter 39, the demodulator 41, the timing generator 44, the code generator 43, the in-phase-analog-to-digital converter 33, and the quadrature-phase-analog-to-digital converter 34.

Referring to FIG. 1, a received-spread-spectrum signal at the signal input is translated to an intermediate frequency or baseband frequency by in-phase mixer 31 and quadrature-phase mixer 32. For discussion purposes, the received-spread-spectrum signal is assumed to be translated to a baseband frequency. Thus, the baseband received-spread-spectrum signal is converted to a digital signal by in-phase analog-to-digital converter 33 and quadrature-phase analog-to-digital converter 34. Thus, a baseband version of the received-spread-spectrum signal is at the input of the in-phase-symbol-matched filter 35 and at the input of the quadrature-phase-symbol-matched filter 37.

The in-phase-symbol-matched filter 35 has an in-phase-symbol-impulse response which is set by the replica of the data-chip-sequence signal from code generator 43. Depending on the setting, the in-phase-symbol-matched filter 35 can despread the received-spread-spectrum signal as a despread-in-phase component of the data-spread-spectrum channel. Accordingly, the in-phase-symbol-matched filter 35 outputs a despread-in-phase component of the data-bit-sequence signal as a despread-data-bit-sequence signal.

Similarly, the quadrature-phase-symbol-matched filter 37 has a symbol-impulse response which can be set by the replica of the data-chip-sequence signal generated by the code generator 43. Depending on the setting, the quadrature-phase-symbol-matched filter 37 despreads the received-spread-spectrum signal as a quadrature-phase component of the data-spread-spectrum channel. These can be either the despread-quadrature-phase-pilot-bit-sequence signal or the quadrature-phase-data-bit-sequence signal.

The in-phase-symbol-matched filter 35 and the quadrature-phase-symbol-matched filter 37 are ultimately controlled by the controller 46. The controller 46 controls timing and determines at desired timings when the code generator 43 sets the symbol-impulse responses of the in-phase-symbol-matched filter 35 and the quadrature-phase-symbol-matched filter 37 to the data-chip-sequence signal.

As shown in FIG. 2, the controller 46 controls the in-phase signal register 51 and the quadrature-phase signal register 52, which correspond to the in-phase-symbol-matched filter 35 and the quadrature-phase-symbol-matched filter 37, respectively.

In FIG. 1, the Costas loop 36 uses the output from the in-phase-symbol-matched filter 35 and the output of the quadrature-phase-symbol-matched filter 37 to generate the cosine and sine signals for in-phase mixer 31 and quadrature-phase mixer 32, respectively.

When the in-phase-symbol-matched filter 35 and quadrature-phase-symbol-matched filter 37 have their respective symbol-impulse responses matched to the pilot-bit-sequence signal, then the output is a despread-header-sequence signal. The despread-header-bit-sequence signal is passed through in-phase-frame-matched filter 38 and quadrature-phase-frame-matched filter 39, respectively. The in-phase-frame-matched filter 38 has an in-phase-frame-impulse response matched to the in-phase component of the pilot-bit-sequence signal, and accordingly, generates an in-phase-peak-pilot-correlation signal when the in-phase component of the despread-pilot-bit-sequence signal matches the in-phase-frame-impulse response. Similarly, the quadrature-phase-frame-matched filter 39 has a quadrature-phase-frame-impulse response matched to a quadrature-phase component of the pilot-bit-sequence signal. When the despread pilot-bit-sequence signal from the quadrature-phase-symbol-matched filter 37 matches the quadrature-phase-frame-impulse response of the quadrature-phase-matched filter 37, then the quadrature-phase-frame-matched filter outputs a quadrature-phase-peak-pilot-correlation signal. The in-phase-peak-pilot-correlation signal and the quadrature-phase-peak-pilot-correlation signal are demodulated by demodulator 41, and can be used as a initial timing signal for controlling when the diversity combiner 42 combines the output from the demodulator 41 for the respective signals from in-phase-symbol-matched filter 35 and the quadrature-phase-symbol-matched filter 37.

Additionally, the in-phase-peak-pilot-correlation signal and the quadrature-phase-peak-pilot-correlation signal can be processed by frame processor 40 to trigger a timing signal to controller 46 which actuates the timing for when a respective in-phase-symbol-impulse response and the quadrature-phase-symbol-impulse response of the in-phase-symbol-matched filter 35 and the quadrature-phase-symbol-matched filter 37, respectively are matched to the data-chip-sequence signal.

In a particular implementation of the present invention, the in-phase-symbol-matched filter 35 and the quadrature-phase-symbol-matched filter 37 have their respective in-phase-symbol-impulse response and quadrature-phase-symbol-impulse response staggered, under the control of the controller 46, such that they are matched to the I and Q to the data-chip-sequence signals every five microseconds. Accordingly, each of the in-phase-symbol-matched filter 35 and the quadrature-phase-symbol-matched filter 37 can have their respective in-phase-symbol-impulse response and quadrature-phase-symbol-impulse response loaded within five microseconds. Typically, current designs have these respective symbol-matched filters loaded within 2.5 microseconds, for a system operating at 100 MHz, with each of the in-phase-symbol-matched filter 35 and the quadrature-phase-symbol-matched filter 37 having a 256 or 64 for chip stage shift register.

The demodulator 41 can be implemented using coherent demodulation, or alternatively noncoherent demodulation.

The diversity combiner 42 combines in a variety of ways, such as maximum likelihood, straight combining, addition, or the demodulated outputs from the in-phase-symbol-matched filter 35 and the quadrature-phase-symbol-matched filter 37 as demodulated through demodulator 41.

FIG. 2 illustrates the matched filter using the time sharing of the multiplier array and adder tree. Shown in FIG. 2 are in-phase-signal register 51, quadrature-phase-signal register 52, multiplexer 57, reference-signal register 53, multiplier array 54, adder tree 55, data register 56, and controller 46. As shown, the dotted lines indicate that the controller 46 provides the necessary controlling of the in-phase-signal register 51, the quadrature-phase-signal register 52, the reference-signal reference 53 and the data register 56. The solid lines indicate the signal flow from the in-phase-signal register 51, the quadrature-phase-signal register 52, the reference-signal register 53 through multiplexer 57. The in-phase-signal register 51 and the quadrature-phase-signal register 52 are coupled through multiplexer 57 to multiplier array 54 to adder tree 55 to data register 56. The data register 56 has the in-phase output and quadrature-phase output.

Figure 5:
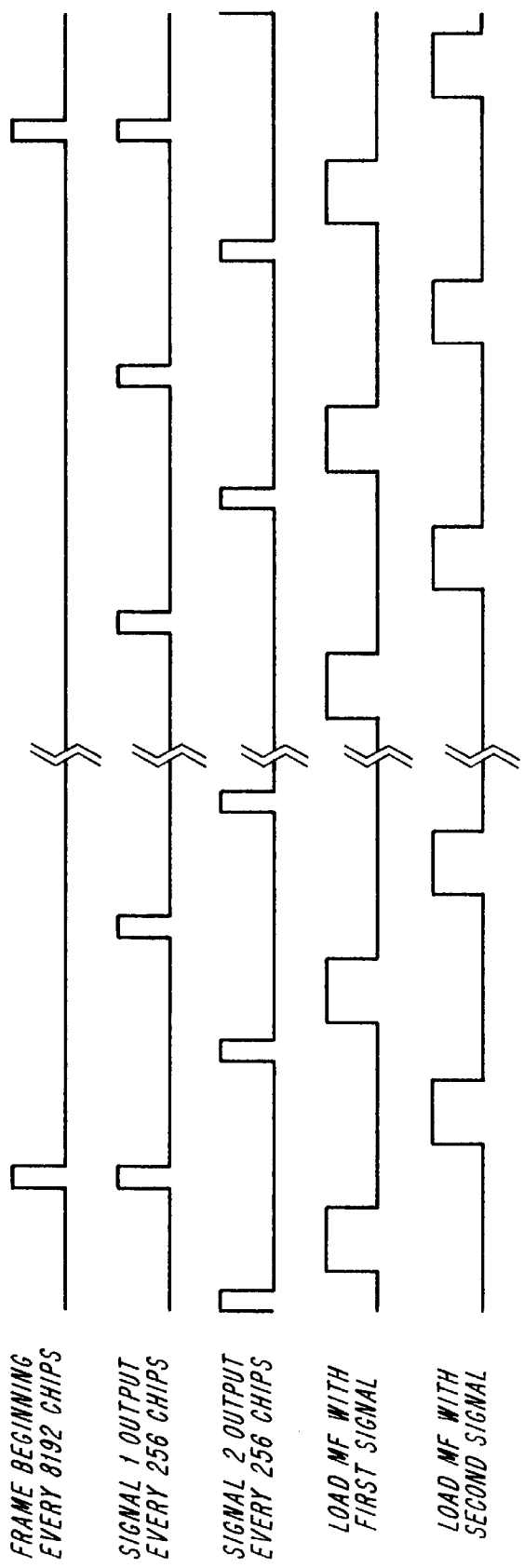
FIG. 5 shows possible timing of signal-time-sharing, matched-filter-based demodulator.

For either embodiment, the header or pilot channel, FIG. 5 illustrates block timing of the signal sharing, matched-filter-based correlator. As shown, a frame can begin every 8192 chips and a first signal, such as the header-bit-sequence signal can be output from the code generator 43 every 256 or 64 chips. Similarly, a second signal, such as a data-chip-sequence signal can be output every 256 chips, but staggered from the first signal, i.e., the pilot signal. Thus, the in-phase-symbol-matched filter 35 and the quadrature-phase-symbol-matched filter 37 are loaded with the first signal, the header or the pilot-chip-sequence signal, and then staggered and loaded with the second signal, the data-chip-sequence signal. The first signal would represent loading the respective matched filters with the header or the pilot-chip-sequence signal and the second signal would be the timing for loading the respective matched filters with the data-chip-sequence signal.

The present invention also includes a method which uses a symbol-matched filter and a frame-matched filter with a spread-spectrum receiver on a received-spread-spectrum signal. As with the apparatus previously disclosed, the received-spread-spectrum signal is assumed to have a data-spread-spectrum channel. The pilot-spread-spectrum channel is generated from spread-spectrum processing a pilot-bit-sequence signal with a pilot-chip-sequence signal. The data-spread-spectrum channel is generated from spread-spectrum processing a data-bit-sequence signal with a data-chip-sequence signal.

The method comprises the steps of generating a replica of the data-chip-sequence signal. In response to the currents of a peak-header correlation signal, at an appropriate delay, the method generates a pilot-control signal. In response to the pilot-control signal, the method programs the symbol-matched filter with the replica of the pilot-bit-sequence signal to set the symbol-matched filter to have a symbol-impulse response matched to the pilot-bit-sequence signal. With the symbol-matched filter matched to the pilot-chip-sequence signal, the method despreads the data-spread-spectrum channel from the received-spread-spectrum signal as a despread pilot-bit-sequence signal.

The frame-matched filter has a frame-impulse response matched to the pilot-bit-sequence signal. The method therefore uses the frame-matched filter to filter the despread pilot-bit-sequence signal. The method thereafter generates from the filtered despread-data-bit-sequence signal, the peak-pilot-correlation signal in response to the despread-pilot-bit-sequence signal matching the frame-impulse response of the frame-matched filter.

The method also generates at a time delay from the pilot-control signal, and in response to the peak-pilot-correlation signal, a data-control signal. In response to the data-control signal, the method programs the symbol-matched filter with the replica of the data-chip-sequence signal so that the symbol-matched filter has the symbol-impulse response matched to the data-chip-sequence signal. The method thereby despreads, while the symbol-matched filter is matched to the data-chip-sequence signal, the data-spread-spectrum channel from the received-spread-spectrum signal as a despread-data-bit-sequence signal.

The method as described herein may be extended to in-phase and quadrature-phase components of a received-spread-spectrum signal. As such, the method would have the step of despreading the pilot-spread-spectrum channel from the received-spread-spectrum signal including the steps of despreading, from the received-spread-spectrum signal, the in-phase component of the pilot-spread-spectrum channel from the received-spread-spectrum signal including the steps of despreading, from the received-spread-spectrum signal, the in-phase component of the pilot-spread-spectrum channel as a despread in-phase component of the pilot-bit-sequence signal, and despreading, from the received-spread-spectrum signal, the quadrature-phase component of the pilot-spread-spectrum channel as a despread-quadrature-phase component of the pilot-bit-sequence signal.

Similarly, the in-phase component and the quadrature-phase component of the received-spread-spectrum signal can be despread as in-phase components and quadrature-phase components of the data-spread-spectrum channel. Accordingly, the method would include despreading, from the received-spread-spectrum signal, an in-phase component of the data-spread-spectrum channel as a despread-in-phase component of the despread-data-bit-sequence signal. The method would also include despreading, a quadrature-phase component of the data-spread-spectrum channel as a despread-quadrature-phase component of the despread-data-bit-sequence signal.

When filtering the despread data-bit-sequence signal into in-phase components and quadrature-phase components of the despread-data-bit-sequence signal, the method can also include generating an in-phase-peak-data-correlation signal and a quadrature-phase-peak-data-correlation signal, in response to the in-phase component and the quadrature-phase component of the despread header-bit-sequence signal matching the in-phase-frame-impulse response and the quadrature-phase-frame-impulse response, respectively.

Matched Filter Operation

In operation, for both embodiments, header and pilot channel, the in-phase-symbol-matched filter 35 and the quadrature-phase-symbol-matched filter 37 are loaded with M local sequence symbols, i.e., the replica of the chip-sequence signal. The incoming received-spread-spectrum-signal samples generated by in-phase-analog-to-digital converter 33 and quadrature-phase-analog-to-digital converter 34, respectively, slide by, i.e. are correlated against, the local replicas until they line up, at which time a large information bearing output is produced. The generation of this large output does not require that a synchronization process be successfully completed a priori or that additional circuits dedicated to the acquisition process be employed and it achieves code synchronization in the shortest possible time to acquire the incoming spreading chip-sequence signal. This has the advantage of lower implementation cost, lower physical volume, reduced power consumption, more rapid implementation and much better performance as measured by the time required to achieve code synchronization.

The presence of a strong signal level output indicates that at that specific moment in time M incoming signal symbols and the M symbols of the local spreading code, i.e., chip-sequence signal, loaded in the in-phase-symbol-matched filter 35 and the quadrature-phase-symbol-matched filter 37 are in alignment. The requirement exists that the in-phase-symbol-matched filter 35 and the quadrature-phase-symbol-matched filter 37 be fully loaded with the next M symbols of the local spreading code, i.e., the chip-sequence signal, at any time prior to the arrival of the next M incoming signal symbols at the in-phase-symbol-matched filter 35 and the quadrature-phase-symbol-matched filter 37. The value of the number M, which denotes the size of the respective symbol-matched filter as measured in number of signal samples, is much larger than any value on the order of one; in an example embodiment, M is on the order of 256. Because M is much larger than one of the circuits required to implement the code, phase synchronization functions are much easier to design and implement. This has the advantage of lower implementation cost, lower physical volume, reduced power consumption, more rapid implementation and inherently better performance.

The in-phase-symbol-matched filter 35 and the quadrature-phase-programmable filter 37 identify, characterize and extract the information which arrives through all available channels, or paths, intrinsically, without any additional and parallel signal processing paths. The spreading code loaded as a local reference in the in-phase-symbol-matched filter 35 and the quadrature-phase-symbol-matched filter 37 remain in place until all propagation channels have the opportunity to deliver the information signal at the in-phase-symbol-matched filter 35 and the quadrature-phase-symbol-matched filter 37; the matched filter can then easily recover all $L=T_M(W+1)$ signals it is capable of receiving. As the input signals are offset in time due to differences in length of the propagation path, and since the in-phase-symbol-matched filter 35 and the quadrature-phase-symbol-matched filter 37 are linear devices, the outputs due to the signals' propagation through different channels are output by the in-phase-symbol-matched filter 35 and the quadrature-phase-symbol-matched filter 37 offset in time. Thus the reception and separation of the signals propagating through different channels does not require any additional circuits and the individual signals, which are now separate in time, can be easily individually manipulated and combined in optimum ways such that the matched filter receiver attains the performance of an L-diversity system.

A receiver capable of identifying, separating and combining large numbers (L) of signal replicas propagating through different channels is a time diversity receiver and is commonly called a RAKE receiver. The RAKE receiver structure can be implemented using the matched filter without the excessive complexity incurred by alternative system implementations. The in-phase-symbol-matched filter 35 and the quadrature-phase-symbol-matched filter 37 implementation of the heart of the diversity processing system has the advantage of lower implementation cost, lower physical volume, reduced power consumption, more rapid implementation, less complex control and better performance.

In contrast, the programmable-matched-filter-based demodulator as described herein utilizes only one such set of circuits and, using information which is intrinsically generated, can then coherently demodulate any number of signal replicas that arrive via separate propagation paths. The mechanism by which this is accomplished is to employ one conventional phase tracking circuit, e.g., phase-locked loop (PLLs), Costas loop, or $n^{th}$ power loop, in order to establish a temporarily stable phase reference and to then extract the phase offset of each individual signal with respect to that phase reference. The incoming signal is first downconverted non-coherently to some frequency, including the 0 Hz frequency (DC). Then the in-phase and quadrature-phase channel outputs are read from the in-phase-symbol-matched filter 35 and the quadrature-phase-symbol-matched filter 37, respectively. The phase offset of the carrier signal is contained in the relative amplitudes of the in-phase and quadrature-phase outputs which are then used directly to demodulate the received data signal. Alternatively the phase estimate on the individual propagation paths can be improved by further matched filtering to demodulate the signal with performance equal to or better than that obtained using conventional coherent demodulators but without the added complexity introduced by conventional coherent demodulators. Therefore the symbol-matched filter-based implementation has the advantage of much lower complexity, lower implementation cost, lower physical volume, reduced power consumption, more rapid implementation and better performance.

A set of multipliers and the associated adder tree may be eliminated. By inputting the signals at the input of the remaining set of multipliers and the associated adder tree from two multiplexers, each multiplexer may serve to connect to the multiplier/adder tree structure either the in-phase or quadrature-phase signal registers. This implementation adds the complexity of two multiplexers and reduces the complexity associated with a set of multipliers and an adder tree for a significant net reduction in complexity.

The symbol-matched filter is a digital signal processor, the output of which is of interest only at that instant in time when the portion of interest of the incoming signal is fully loaded and is of no interest at any other time. In the present implementation the size of the symbol-matched filters is approximately 64 or 256 stages, requiring 64 or 256 clock cycles, respectively, to load the input samples of the received-spread-spectrum signal. The output of the symbol-matched filter is of interest only for one or two clock cycles and is of no interest for the rest of the approximately 248 clock cycles. Thus the circuit can be reused during these 248 clock cycles. Two or more signals, say N signals, can utilize the same matched filter provided that the signals are not lined up in phase and thus the outputs are staggered in time. If N=5 signals shared the same matched filter, then the signals could then be staggered by approximately 45 clock cycles and the matched filter could be operated in a number of ways, including the following manner:

1. Starting at clock cycle 5, the symbol-matched filters are loaded with the reference corresponding to the first signal. The output due tO the first signal will occur during the $50^{th}$ and $51^{st}$ clock cycle.

2. Starting at clock cycle 55, the symbol-matched filters are loaded with the reference corresponding to the second signal. The output due to the second signal will occur during the $100^{th}$ and $101^{st}$ clock cycle.

3. Starting at clock cycle 105, the symbol-matched filters are loaded with the reference corresponding to the third signal. The output to the third signal will occur during the $150^{th}$ and $151^{st}$ clock cycle.

4. Starting at clock cycle 155, the symbol-matched filters are loaded with the reference corresponding to the fourth signal. The output due to the fourth signal will occur during the $200^{th}$ and $201^{st}$ clock cycle.

5. Starting at clock cycle 205, the symbol-matched filters are loaded with the reference corresponding to the fifth signal. The output due to the fifth signal will occur during the $250^{th}$ and $251^{st}$ clock cycle.

The cycle then repeats itself for the next output due to the first, second, third, fourth and fifth signals using only one matched filter. The complexity of and size of implementation is reduced by 80% while the signal processing benefits remain constant.

Power Management of a Matched Filter

The present invention broadly includes an intelligent power management system for a matched filter. The matched filter may be programmable, or preset. In a preferred embodiment, the matched filter is the symbol-matched filter, discussed previously.

The intelligent power management system includes shifting means, multiplexing means, correlating means, and controlling means. The multiplexing means is coupled operatively between the shifting means and the correlating means. The controlling means is coupled operatively between the correlating and the multiplexing means, and may include circuitry for providing signals to controlling means such as tracking and acquisition circuits. The controlling means may be integrated with the control means, previously discussed.

The shifting means shifts sets of in-phase chips and sets of quadrature-phase chips. The output of the shifting means is denoted herein as the shifted-in-phase chips and the shifted-quadrature-phase chips. The multiplexing means multiplexes the shifted-in-phase-chips and the shifted-quadrature-phase-chips. The multiplexed chips include alternating sets of shifted-in-phase chips and shifted-quadrature-phase chips. Thus, at the output of the multiplexing means is a set of shifted-in-phase chips, then a set of shifted-quadrature-phase chips, then a set of shifted-in-phase chips, etc.

In response to an ACTIVATION signal and the multiplexed chips having a particular-chip sequence, the correlating means correlates the multiplexed chips with settings of the correlating means. The settings of the correlating means are matched to the particular-chip sequence. Thus, a set of shifted-in-phase chips is correlated with the settings of the correlating means, to determine if there were a match. Then, a set of shifted-quadrature-phase chips is correlated with the settings of the correlating means, to determine if there were a match. A match occurs when the shifted-in-phase chips or the shifted-quadrature-phase chips have the particular-chip sequence aligned with the settings in the adder tree.

In response to the POWERDOWN signal, which occurs during the time intervals when the multiplexed chips do not have the particular-chip sequence, the correlating means is inhibited. The POWERDOWN signal typically occurs during a time interval when the shifted-in-phase chips or the shifted-quadrature-phase chips do not produce a correlation peak at the output of the correlating means.

The controlling means uses an acquiring and tracking signal, or a header-correlation signal derived from a received-spread-spectrum signal. The controlling means generates the ACTIVATION signal and POWERDOWN signal at a point timed from the peak-header-correlation signal or tracking signal. The ACTIVATION signal is generated when the multiplexed chips correlate with settings in the correlating means. More particularly, the ACTIVATION signal is generated during times when the in-phase chips and the quadrature-phase chips coming into the shifting means are estimated to correlate with the particular-chip sequence in the adder tree. During other times, the controlling means generates the POWERDOWN signal, which inhibits the correlating means. By not requiring the correlating means to operate during those times when neither the in-phase chips nor the quadrature-phase chips are correlated within the correlating means, considerable power is conserved.

Figure 6:
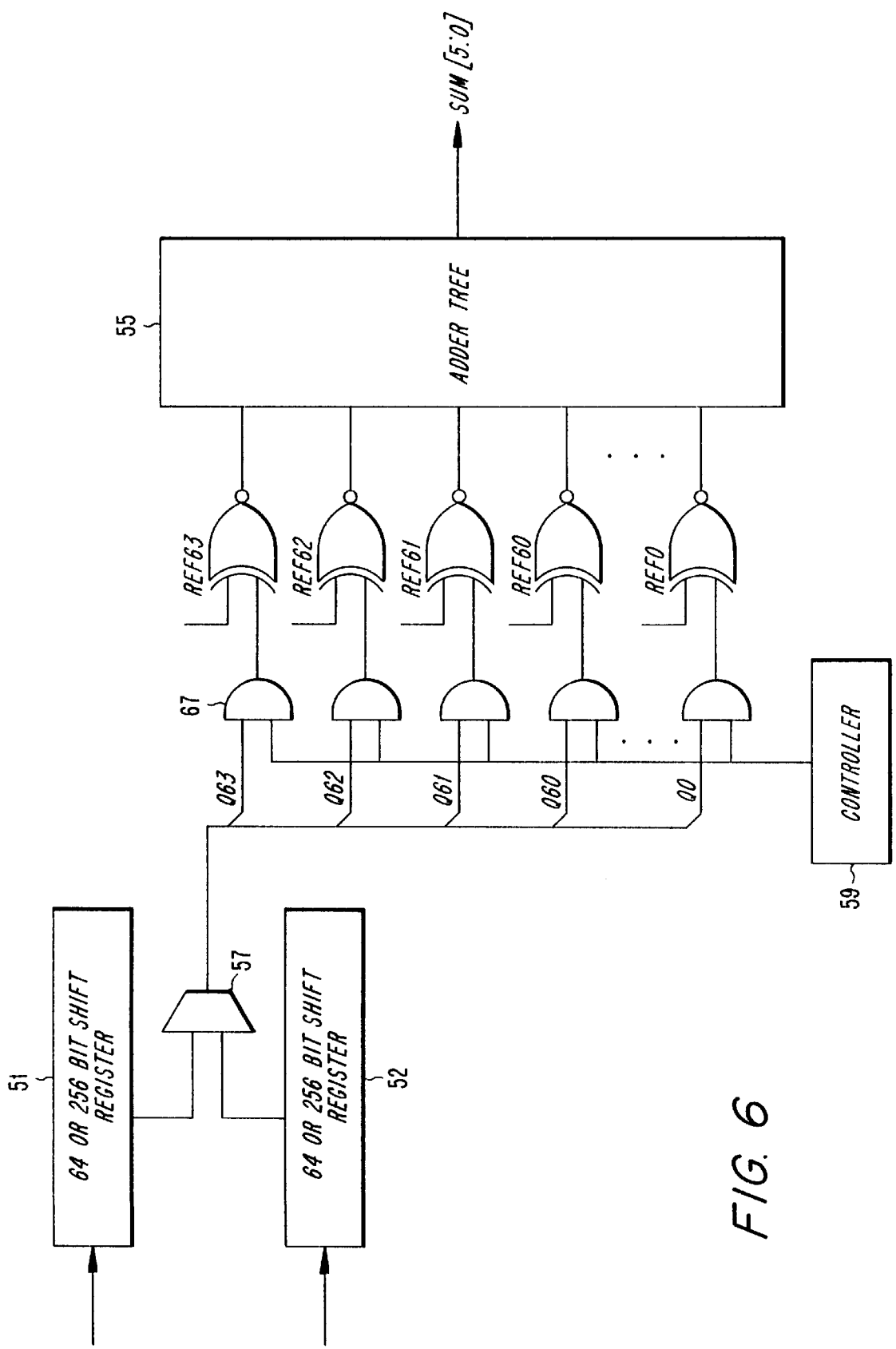
FIG. 6 is a system block diagram of power control of a programmable matched filter.

As illustratively shown in FIG. 6, the shifting means may be embodied as an in-phase-shift register 51 and a quadrature-phase-shift register 52. The multiplexing means may be embodied as a multiplexer 57. The correlating means may be embodied as an adder tree 55. The adder tree 55 typically includes a plurality of gates, which can be set or programmed to match a particular-chip sequence.

The controlling means may be embodied as a controller 59 coupled to a plurality of AND gates 67. While AND gates are shown, other logic gates or a combination of other logic gates may be used to accomplish the same function. See Schilling, DIGITAL INTEGRATED ELECTRONICS.

The in-phase-shift-register 51 is operatively connected to a first input, and the quadrature-phase-shift-register 52 is operatively connected to a second input. The multiplexer 57 is coupled to the in-phase-shift-register 51 and the quadrature-phase-shift-register 52. The plurality of AND gates is coupled to the controller 59 and between the multiplexer 57 and the adder tree 55.

The in-phase-shift-register 51 shifts a set of in-phase chips arriving from an in-phase component of the radio frequency (RF) circuitry or intermediate frequency (IF) circuitry at a first input. The quadrature-phase-shift-register 52 shifts a set of quadrature-phase chips arriving from a quadrature-phase component of the RF circuitry or the IF circuitry. The chips which are continually being demodulated by the RF circuitry and/or the IF circuitry are continually shifted through the in-phase-shift-register 51 and the quadrature-phase-shift-register 52. The in-phase chips and the quadrature-phase chips are from the received-spread-spectrum signal, which passes through the RF and/or IF circuitry.

The multiplexer 57 multiplexes the shifted-in-phase chips and shifted-quadrature-phase chips from the in-phase-shift register 51 and quadrature-phase-shift register 52, respectively. The output of the multiplexer 57 is sets of multiplexed chips which include the shifted-in-phase chips and the shifted-quadrature-phase chips. The sets of shifted-in-phase chips and sets of the shifted-quadrature-phase chips appear alternatingly at the output of the multiplexer 57.

The adder tree 55 is set to match a particular-chip sequence. The adder tree 55 may be programmable or fixed. In a preferred embodiment, the adder tree 55 is programmable and may be set to match any particular-chip sequence desired to be received from a particular received-spread-spectrum signal.

A plurality of AND gates 67 are coupled between the multiplexer 57 and the adder tree 55, and to the controller 59. When a POWERDOWN signal is present, the AND gates 67 inhibit the multiplexed chips, namely, the shifted-in-phase chips and the shifted-quadrature-phase chips from the in-phase-shift register 51 and the quadrature-phase-shift register 52, respectively, from passing to the adder tree 55. During times when an ACTIVATION signal is present, then the plurality of AND gates 67 pass the multiplexed chips to the adder tree 55.

The controller 59 receives a tracking signal or peak-pilot-correlation signal from a tracking circuit or other circuit. The controller 59 generates the POWERDOWN signal when the multiplexed chips from the received-spread-spectrum signal do not have the particular-chip sequence, and generates the ACTIVATION signal when the multiplexed chips from the received-spread-spectrum signal have the particular-chip sequence. More particularly, the controller 59 shuts off the circuitry of the adder tree when there will be no correlation. The in-phase-shift register 51 and the quadrature-phase-shift register 52, however, remain operative during the tracking mode of operation. The controller 59 turns on the entire matched filter, including the adder tree 55, during the clock cycles when the peak correlation signal is expected at the output of the adder tree 55.

During acquisition, the controller 59 turns on the entire adder tree 55 during all clock cycles, because the output of the adder tree 55 needs to be examined every chip time.

Figure 7:
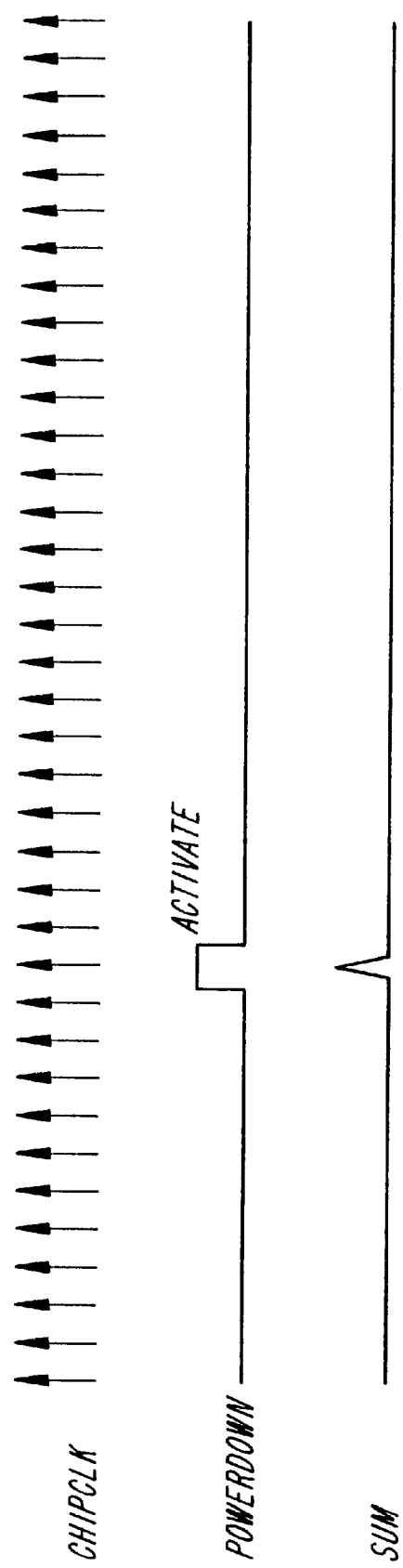
FIG. 7 shows timing signals of a matched filter.

The POWERDOWN signal effectively grounds all inputs to the adder tree 55 of the matched filter. By turning off the circuitry of the adder tree when there will be no correlation between the particular-chip sequence and the received-spread-spectrum signal, considerable power is saved. This power saving can be of great significance when using battery-operated units. A timing sequence is shown in FIG. 7, clearly illustrating the magnitude of the non-correlation period relative to the time when the peak correlation signal is expected.

Figure 8:
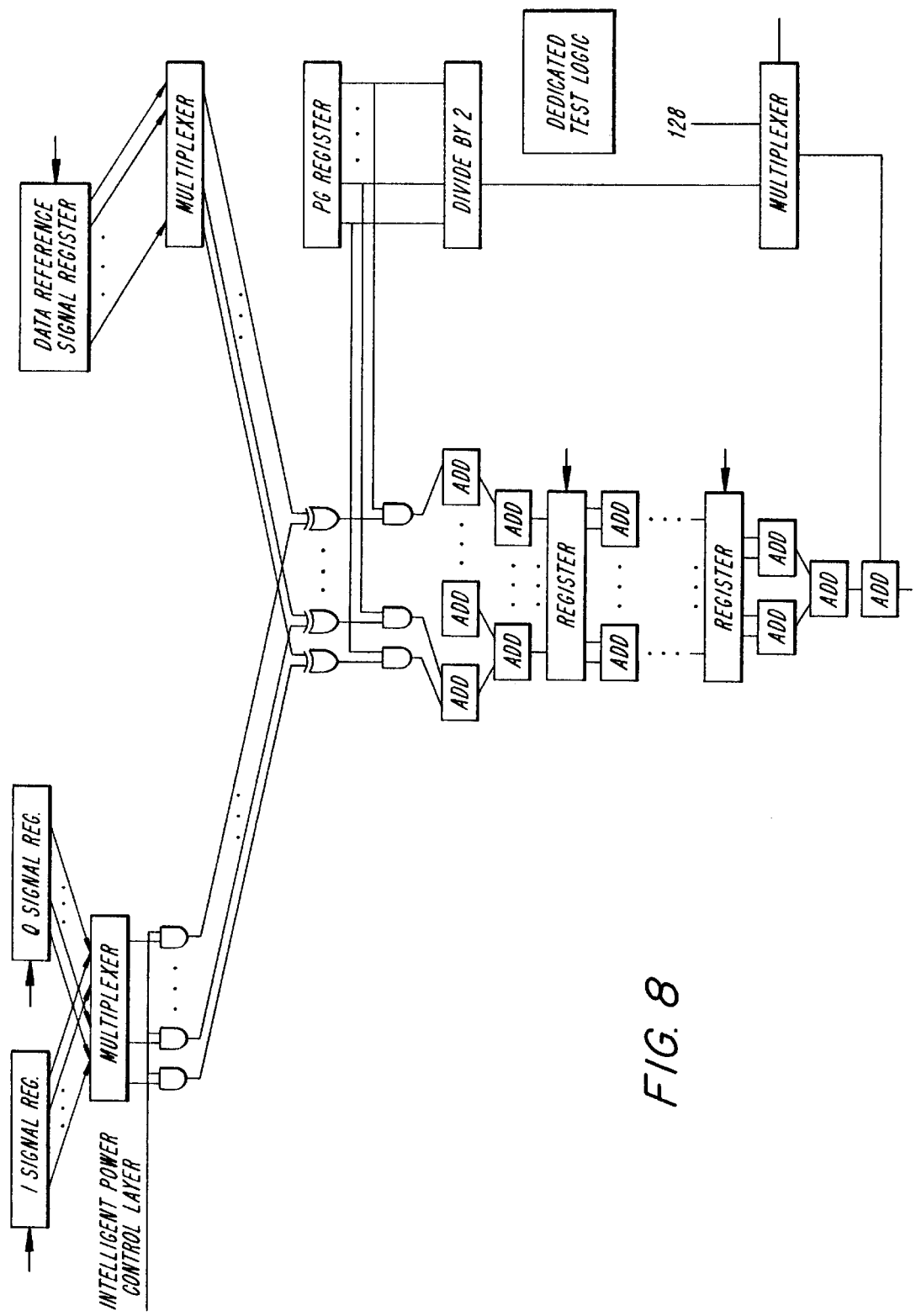
FIG. 8 is a detailed block diagram of power control of a matched filter.

FIG. 8 shows a more detailed aspect of the present invention, as previously discussed.

In use, in-phase chips are shifted through the in-phase shift register 51 and the quadrature-phase chips are shifted through the quadrature-phase-shift register 52. The in-phase chips and the quadrature-phase chips are derived from in-phase and quadrature-phase components of RF or IF circuitry of the spread-spectrum receiver.

During an acquisition phase, the ACTIVATION signal is present at all times, and the adder tree 55 correlates or attempts to correlate and detect the presence of a particular-chip sequence from the in-phase chips and the quadrature-phase chips. After acquisition, the controller 59 generates an ACTIVATION signal during the clock cycles when the peak correlation signal is expected at the output of the adder tree 55. During other times, in between those points in time when a peak-correlation signal is expected at the output of the adder tree 55, a POWERDOWN signal is generated and used to inhibit the gates in the adder tree 55. The POWERDOWN signal typically is applied to the plurality of AND gates 67, which can be used to inhibit activation of the gates in the adder tree 55.

The purpose of the matched filter is to perform the complex correlation of the input signal with the locally stored reference signals. The number of terms used in the correlation, i.e., the processing gain, is a variable that can be changed at any time during the operation of the ASIC.

The matched filter performs complex correlations of two independent signals by multiplexing its operation. Since each correlation is complex and it consists of two separate correlations for the I and Q terms, the matched filter is multiplexed four ways.

The matched filter outputs the result of 256 correlations every complete cycle in a time sequential fashion; for the purpose of this discussion a cycle is the duration of one pilot signal data bit that has a fixed processing gain of 256. Following signal acquisition, the vast majority of the 256 matched filter correlation outputs are not of interest. Only that matched filter correlation output that contains the pilot channel correlation result when the reference and the inputs are aligned, and the matched filter output that contains the data channel correlation result when the reference and the inputs are aligned, are of interest. Thus only a small proportion of all matched filter outputs are of interest. By turning the matched filter off during the time that it computes the result of correlations that are not of interest, the amount of power consumed is significantly reduced.

The input to the matched filter comes from two sources: received signals and internally stored reference signals. The received signals are A/D converted with four bits of accuracy in the present embodiments. The A/D converter inputs an analog signal with zero DC component and outputs a sampled and digitized version of the analog signal represented in the offset binary notation.

The arithmetic operations performed by the matched filter are multiplication of the input sample by the internally stored reference signal sample, offset of the resultant sample value by half the minimum A/D step size, conversion of 2's complement notation, "zero-out" of select signal samples, summation of all signal samples, and modification of the final result to correct the offset introduced earlier. In order to reduce the complexity necessary to perform all operations successfully, several signal representations are used, as summarized in Table 1.

TABLE 1

Numerical Representations

| BITS | 2's COMPL | OFFSET BIN | A/D INPUT |
| --- | --- | --- | --- |
| 0000 | 0 | −8 | −7.5 |
| 0001 | 1 | −7 | −6.5 |
| 0010 | 2 | −6 | −5.5 |
| 0011 | 3 | −5 | −4.5 |
| 0100 | 4 | −4 | −3.5 |
| 0101 | 5 | −3 | 2.5 |
| 0110 | 6 | −2 | −1.5 |
| 0111 | 7 | −1 | −0.5 |
| 1000 | −8 | 0 | 0.5 |
| 1001 | −7 | 1 | 1.5 |
| 1010 | −6 | 2 | 2.5 |
| 1011 | −5 | 3 | 3.5 |
| 1100 | −4 | 4 | 4.5 |
| 1101 | −3 | 5 | 5.5 |
| 1110 | −2 | 6 | 6.5 |
| 1111 | −1 | 7 | 7.5 |

The input is quantized uniformly using the binary notation in the BITS column. Each output code in the BITS column corresponds to an analog value in the A/D INPUT column.

The A/D output codes are applied to the input signal shift register. Each stage of the input signal shift register is multiplied by the corresponding stage in the reference signal shift register. The reference signal shift register contains bipolar signal samples of unit magnitude represented by a HIGH if the sample has a negative value, or by a LOW if the sample has a positive value.

The multiplication of the input signal samples by the stored reference signal samples can be said to be the process of reversal of the polarity of the input signal sample's voltage if the corresponding reference signal sample has a negative value. Table 1 illustrates the relationship that exists between analog voltage samples of identical magnitude but opposite signs, represented by the binary coding scheme used here; multiplication by negative one (−1) requires reversing all four bits of the code word used to represent the voltage sample.

The value of 0.5 is subtracted from all 256 samples (or 64 or any value) in order to remove the decimal part and continue work with integers. This introduces an error of −128 in the total summation which must be subsequently eliminated by adding to the final sum an extra +128 term. The range which was negative 7.5 (−7.5) to positive 7.5 (+7.5) changes to negative 8 (−8) to positive 7 (+7). The new voltage values corresponding to the four bit codes are represented in Table 1 under the OFFSET BIN column.

It is recognized that this range is identical to the range of four bit numbers coded in two's complement code, the corresponding values of which are listed in Table 1 under the 2's COMPL column. A further examination of corresponding entries in Table 1 columns OFFSET BIN and 2's COMPL reveals that the transformation from OFFSET BIN to 2's COMPL can be effected by complementing of the most significant bit (MSB) of the OFFSET BIN code word.

The transformation of the binary code words of 2's complement format enables the use of conventional adders in summing the resultant samples. The summation of all 256 samples is performed, following which the negative 128 bias is removed by adding an extra positive 128 term to the final sum.

The processing gain (PG) is a fundamental measure used to characterize DS-SS systems. The present systems allows the user the flexibility to utilize the largest possible processing gain for transmission, given the required channel data rate. The pilot data is the exception, having a fixed PG value of 256.

The processing gain utilized to spread spectrum modulate data is controlled by an eight bit word (one byte) loaded into the PGAIN register. The PGAIN register is initialized at start up and its contents can be changed at any time during the operation of the ASIC. The PG value is entered in HEX (h) format and it represents the processing gain for the data channel. For example, the value 0Ah (10 decimal) specifies a PG of 10, while the value 54h (84 decimal) specifies a PG of 84. A value of 0 represents a PG of 256. The effect of the processing gain is to "zero-out" those terms that are not to be included in the summation. The offset effect of those terms is not contributed and thus must not be removed. The offset to be removed equals only one half the processing gain.

The power management layer, as illustrated in FIG. 6, buffers the output of the input signal registers. When the AND gates that form this layer are disabled, the input signal register outputs do not propagate throughout the rest of the circuit. Thus, at that time the rest of the circuit does not switch states and the circuit does not consume any power.

The AND gates are enabled only at that time when signals of interest are propagating; otherwise the AND gates are disabled. The savings in power realized via this approach may only be on the order of 80% if the input signal registers must still remain continuously on.

The pilot reference signal register stores the PN chips used to spread, i.e., modulate, the pilot data bits. It is configured as a 256-stage shift register and provides parallel outputs. The data contained in this register is used to correlate with the 4 bit data contained in the I_SIG and Q_SIG registers.

The pilot reference signal register is initialized at start up and normally does not change in normal operation. Should system requirements demand that the pilot channel PN code change, the system allows the pilot reference signal register to be reloaded with a different and arbitrary code.

The data reference signal register is implemented as a 256 or 64 etc. stage shift register and it provides parallel outputs. In operation it continuously changes its contents in a bursty mode; specifically, the contents of the data reference signal register are stationary for 75% of the data bit period and are updated during 25% of the data bit period. The update period is contiguous and its placement in time is fixed with respect to the START_FRAME signal.

The matched filter core consists of all building blocks required to perform the sample-by-sample multiplication of the input and reference signal samples, the conversion to 2's complement binary format, the zeroing-out of select terms and the addition of the resulting operands. The final output represents the correlation of the input and reference signals using a specified number of terms (PG) as specified in the PGAIN register.

The input register samples are quantized to 4 bits per sample by an external A/D converter. The 4-bit-input samples provided by the A/D converter are coded in the offset binary representation such that any two valid voltage values equal in magnitude and of opposite signal are represented by taking two identical bit patterns and reversing all bits in one of them. Multiplication therefore takes place by not reversing the bits of the input signal sample if the reference signal sample has a positive value, i.e., logic LOW, and reversing all bits of the input signal sample if the reference signal sample has a negative value, i.e., logic HIGH.

The conversion to 2's complement format is accomplished by adding a −0.5 voltage offset to each input signal sample. That implies that the binary code that represented the voltage value "X.5", with X an integer, now represents the voltage value "X", and the binary code that represented the voltage value "−X.5" now represents the voltage value "−X−1". It is only necessary to accept and use the assignment of the new voltage values to the binary codes in order to effect this transformation; the physical implementation of any logic function is not necessary.

The system offers the use of user-selected processing gains. As limitations the processing gain must be an integer, and the values of processing gain are selectable in the range 1 through 256 (1–256) and one through 32 times 256 in power of two steps (n·256, n=2, 4, 8, 16 or 32).

The selection of terms to be zeroed-out is the method by which the processing gain is varied from 1 through 256; for PG=1, 255 terms of the summation are zeroed-out while for PG=256, 0 terms of the summation are zeroed-out.

The value of the processing gain, and therefore the number of terms to be zeroed-out, is dictated by the 8-bit value written in the PGAIN register. The contents of the PGAIN register can be changed at the ASIC initialization stage as well as at any time thereafter. The zeroed-out terms should be consecutive and reside in the highest order section of the input signal shift register, i.e., the earliest input values are zeroed-out.

The addition layer accepts 256 4-bit samples and is configured in a pipelined "adder tree" architecture. Pipeline registers are placed every two adder layers. The number of adder layers is eight; therefore the size of the output word is 12 bits. The final matched filter output is truncated to the 8 MSBs, and the −128 offset introduced earlier is removed by adding the term 1000b to the truncated 8 bit number.

There are three pipeline register layers. The first layer follows the second adder layer and consists of a 64 stage register 6 bits wide. The second layer follows the fourth adder layer and consists of a 16 stage register 8 bits wide. The third layer follows the sixth adder layer and consists of a 4 stage register 10 bits wide.

The pipeline registers are driven by the clock signals; the selection of the specific clock driver signal is governed by the selection of an even or an odd phase of the eight phase clock to input new samples.

The matched filter is operated in a multiplexed fashion; its output is demultiplexed following the last adder stage. The demultiplexing is accomplished by clocking the matched filter outputs into the IDATA and QDATA registers as appropriate. Additional registers can be used to extract additional outputs.

The present invention may be extended to vary the processing gain of a symbol-matched filter. The processing gain is varied by varying the structure, that is, picking the registers within the structure of the symbol-matched filter, to achieve a particular processing gain.

Figure 9:
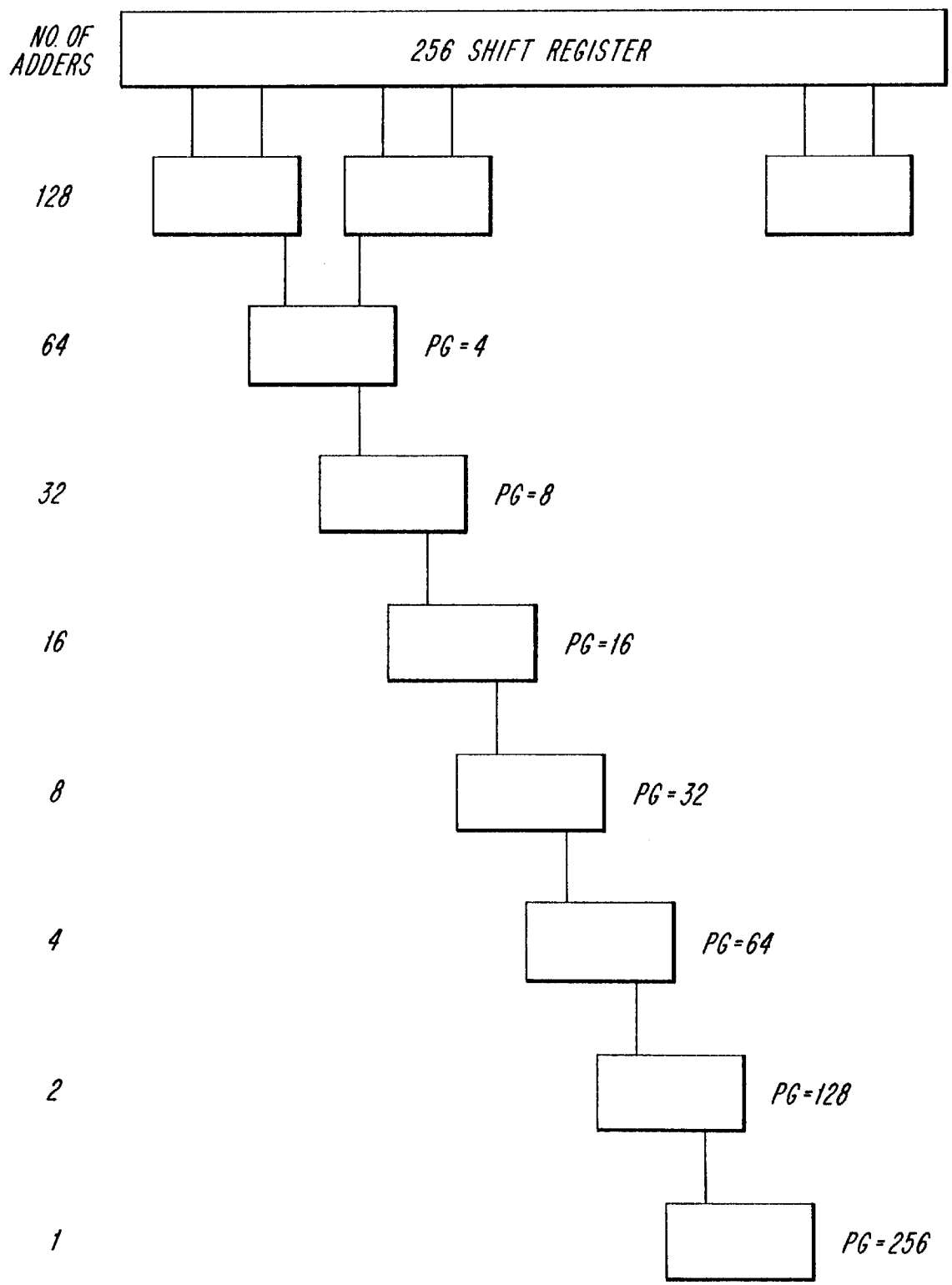
FIG. 9 is a block diagram illustrating intermediate stages of the adder tree.

As illustratively shown in FIG. 9, one approach is to pick the symbol-matched filter outputs from intermediate stages of the adder tree. Thus, if 8 adders were chosen, for example, then a processing gain would be 32. These 8 adders could be chosen by applying the ACTIVATION signal to the chosen 8 adders, and by default, a POWERDOWN signal is applied to the other registers.

Figure 10:
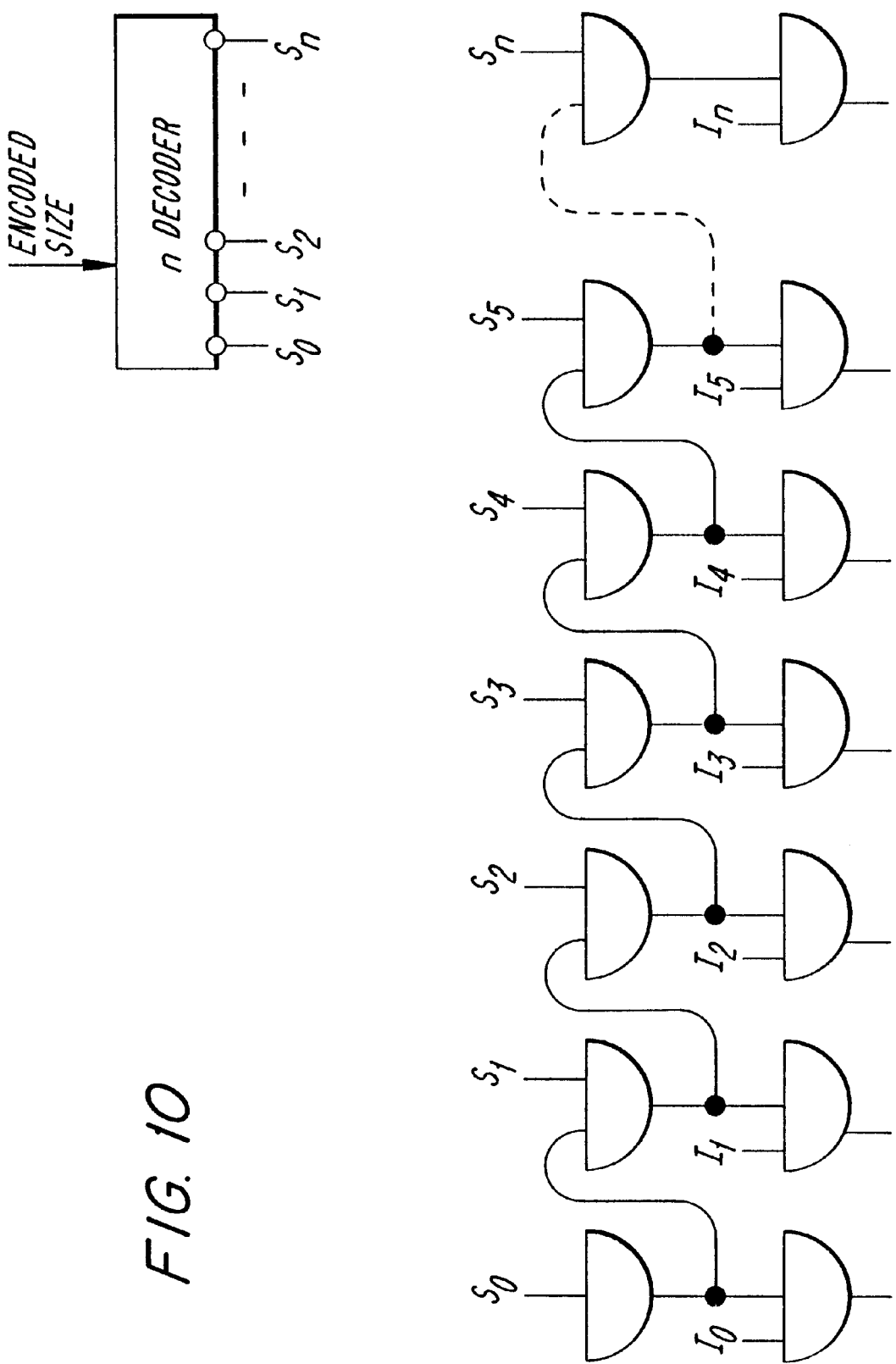
FIG. 10 illustrates gates for use with an enable signal.

As shown in FIG. 10, an alternate approach can be used if the required processing gain is not a power of 2. Now, the adder inputs are gated with an ACTIVATION signal, i.e., an enable signal, such that only a portion of the adder tree is activated and the rest is driven with 0's. In this circuit, the normal adder inputs are $I_0, \ldots, I_n$. The processing gain programming section is accomplished through inputs $S_0, \ldots, S_n$. When a size is selected, the encoded size input to the decoder is chosen such that the desired $S_i$ output is asserted, low in this case, and the rest of the decoder outputs are at a logic high. When $S_i=0$, all AND gates located to the right of $S_i$ have the respective outputs at logic low, thereby grounding their respective adder inputs. The resultant sum of the adder tree is thus effected by the set of inputs $I_0, \ldots, I_{i-1}$.

It will be apparent to those skilled in the art that various modifications can be made to the spread-spectrum-matched-filter apparatus of the instant invention without departing from the scope or spirit of the invention, and it is intended that the present invention cover modifications and variations of the spread-spectrum-matched-filter apparatus provided they come within the scope of the appended claims and their equivalents.

We claim:

1. An intelligent power management apparatus for a symbol-matched filter having a variable processing gain, comprising:

an in-phase-shift register connected to a first input for shifting in-phase chips from said first input generated from a received-spread-spectrum signal as shifted-in-phase chips;

a quadrature-phase-shift register connected to a second input for shifting quadrature-phase chips from said second input generated from the received-spread-spectrum signal as shifted-quadrature-phase chips;

a multiplexer, coupled to said in-phase-shift register and to said quadrature-phase-shift register, for multiplexing the shifted-in-phase chips and the shifted-quadrature-phase chips from said in-phase-shift register and said quadrature-phase-shift register, respectively, thereby generating multiplexed chips, said multiplexed chips including alternating sets of shifted-in-phase chips and sets of shifted-quadrature-phase chips;

a controller for generating an ACTIVATION signal at all times during an acquisition phase, said controller, responsive to a tracking signal from a tracking circuit indicating successful acquisition, for generating a POWERDOWN signal when the multiplexed chips are unlikely to have a particular-chip sequence, and for generating the ACTIVATION signal when the multiplexed chips are likely to have the particular-chip sequence;

an adder tree having a plurality of adders for attempting to correlate the multiplexed chips with the particular-chip sequence, a subset of the plurality of adders being selectable responsive to application of the ACTIVATION signal to the subset, with a POWERDOWN signal being applied to a non-selected subset of the plurality of adders, whereby the processing gain of the symbol-matched filter may be varied dependent on the subset and the non-selected subset of the plurality of adders; and a plurality of AND gates coupled to said controller and between said multiplexer and said adder tree, responsive to the POWERDOWN signal, for inhibiting the multiplexed chips from passing to the non-selected subset of the plurality of adders, and responsive to the ACTIVATION signal, for passing the multiplexed chips to the subset of the plurality of adders selected.

2. An intelligent power management system for a matched filter having a variable processing gain, comprising:

shifting means for shifting in-phase chips and quadrature-phase chips as shifted-in-phase chips and shifted-quadrature-phase chips, respectively;

multiplexing means for multiplexing the shifted-in-phase chips and the shifted-quadrature-phase chips to generate multiplexed chips including alternating sets of shifted-in-phase chips and sets of shifted-quadrature-phase chips;

a plurality of adders, responsive to an ACTIVATION signal, for attempting to correlate the multiplexed chips with settings of said plurality of adders, said plurality of adders, responsive to a POWERDOWN signal, for ceasing to attempt to correlate the multiplexed chips with settings of said plurality of adders; and controlling means for generating the ACTIVATION signal at all times during an acquisition phase, said controlling means, responsive to acquiring and tracking a received-spread-spectrum signal, for generating the ACTIVATION signal only when the multiplexed chips are likely to correlate with settings in said plurality of adders and for directing the ACTIVATION signal to only a selected subset of said plurality of adders, said controlling means for generating the POWERDOWN signal when the multiplexed chips are unlikely to correlate with settings in said plurality of adders and for directing the POWERDOWN signal to a non-selected subset of said plurality of adders, whereby the processing gain of the matched filter may be varied dependent on the selected subset and the non-selected subset of said plurality of adders.

3. A method for intelligently controlling power while controlling processing gain in a symbol-matched filter having an in-phase shift register, a quadrature-phase shift register, and an adder tree having a plurality of adders, comprising the steps of:

shifting in-phase chips through said in-phase-shift register;

shifting quadrature-phase chips through said quadrature-phase-shift register;

multiplexing the shifted-in-phase chips with the shifted-quadrature-phase chips to generate multiplexed chips;

generating, at all times during an acquisition phase, an ACTIVATION signal for passing multiplexed chips through said adder tree to allow detection of multiplexed chips that correlate with settings of said adder tree;

generating, in response to tracking and acquiring a received-spread-spectrum signal, a POWERDOWN signal when the multiplexed chips are unlikely to correlate with settings of said adder tree;

inhibiting, responsive to the POWERDOWN signal, said adder tree;

generating, in response to tracking and acquiring a received-spread-spectrum signal, an ACTIVATION signal only when the multiplexed chips are likely to achieve a correlation with settings of said adder tree;

determining a processing gain of the symbol-matched filter by selecting a subset of the plurality of adders;

directing the ACTIVATION signal to the selected subset of the plurality of adders;

passing, responsive to the ACTIVATION signal, the multiplexed chips through the selected subset of the plurality of adders of said adder tree;

directing the POWERDOWN signal to a remaining subset of the plurality of adders, the remaining subset being those adders within the plurality of adders other than the selected subset of the plurality of adders; and inhibiting, responsive to the POWERDOWN signal, the remaining subset of the plurality of adders.

* * * * *